(12) United States Patent
Priyantha et al.

(10) Patent No.: US 10,992,338 B1
(45) Date of Patent: Apr. 27, 2021

(54) SECURE WIRELESS IOT PLATFORM

(71) Applicant: Microsoft Technology Licensing, LLC, Redmond, WA (US)

(72) Inventors: Nissanka Arachchige Bodhi Priyantha, Redmond, WA (US); Deepak Vasisht, Redmond, WA (US); Ranveer Chandra, Kirkland, WA (US); Heping Shi, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/906,184

(22) Filed: Jun. 19, 2020

(51) Int. Cl.
| | |
|---|---|
| *H04B 1/713* | (2011.01) |
| *H04W 16/14* | (2009.01) |
| *H04B 17/345* | (2015.01) |
| *H04B 17/318* | (2015.01) |
| *H04L 29/08* | (2006.01) |

(52) U.S. Cl.
CPC .......... *H04B 1/713* (2013.01); *H04B 17/318* (2015.01); *H04B 17/345* (2015.01); *H04W 16/14* (2013.01); *H04L 67/12* (2013.01)

(58) Field of Classification Search
CPC .... H04B 1/713; H04B 17/318; H04B 17/345; H04L 67/12; H04W 16/14
See application file for complete search history.

(56) References Cited

U.S. PATENT DOCUMENTS

| | | | | |
|---|---|---|---|---|
| 7,876,786 B2* | 1/2011 | Bahl | ............... | H04W 16/14 |
| | | | | 370/478 |
| 8,170,577 B2* | 5/2012 | Singh | ............... | H04W 52/367 |
| | | | | 455/454 |
| 8,374,212 B2* | 2/2013 | Charbit | ............... | H04W 72/082 |
| | | | | 375/132 |
| 8,401,564 B2* | 3/2013 | Singh | ............... | H04W 4/02 |
| | | | | 455/454 |
| 8,488,633 B2* | 7/2013 | Bahl | ............... | H04W 72/0446 |
| | | | | 370/478 |
| 8,553,644 B2* | 10/2013 | Laroia | ............... | H04W 72/02 |
| | | | | 370/331 |
| 8,675,605 B2* | 3/2014 | Charbit | ............... | H04B 1/713 |
| | | | | 370/331 |
| 8,929,933 B2* | 1/2015 | Tan | ............... | H04W 72/082 |
| | | | | 455/501 |
| 9,338,604 B2* | 5/2016 | Stanforth | ............... | H04W 16/14 |
| 9,374,753 B2* | 6/2016 | Webb | ............... | H04L 5/0032 |
| 9,456,438 B2* | 9/2016 | Webb | ............... | H04W 72/1226 |
| 9,730,186 B2* | 8/2017 | Chandra | ............... | H04W 16/14 |
| 9,774,366 B2* | 9/2017 | Webb | ............... | H04B 1/715 |
| 9,918,313 B2* | 3/2018 | Tan | ............... | H04L 27/0006 |
| 10,182,385 B2* | 1/2019 | Zawodniok | ............... | H04W 48/14 |

(Continued)

*Primary Examiner* — James M Perez

(74) *Attorney, Agent, or Firm* — Workman Nydegger

(57) ABSTRACT

A secure wireless IoT platform configured to provide secure channel hopping for transmitting or receiving messages over a television whitespace spectrum. The platform includes a client device and a base station in communication with a gateway device which provides internet access. A secret key is determined based on the transmission loss associated with the transmission and potentially a new parameter. A next hopping channel is determined in a safe manner to ensure secure communications between the multiple devices.

20 Claims, 17 Drawing Sheets

(56) References Cited

U.S. PATENT DOCUMENTS

| | | | |
|---|---|---|---|
| 2009/0196180 A1* | 8/2009 | Bahl | H04W 72/0446 370/235 |
| 2011/0032892 A1* | 2/2011 | Bahl | H04L 5/0032 370/329 |
| 2012/0252508 A1* | 10/2012 | Uusitalo | H04W 16/14 455/500 |
| 2012/0307744 A1* | 12/2012 | Charbit | H04B 1/713 370/329 |
| 2012/0307869 A1* | 12/2012 | Charbit | H04B 1/715 375/132 |
| 2012/0329384 A1* | 12/2012 | Boldyrev | H04W 12/02 455/39 |
| 2013/0072106 A1* | 3/2013 | Koskela | H04W 72/005 455/3.01 |
| 2013/0272156 A1* | 10/2013 | Webb | H04L 67/28 370/252 |
| 2013/0301622 A1* | 11/2013 | Bahl | H04L 5/0032 370/336 |
| 2014/0112179 A1* | 4/2014 | Muraoka | H04W 52/242 370/252 |
| 2014/0308967 A1* | 10/2014 | Webb | H04W 12/06 455/452.1 |
| 2014/0321509 A1* | 10/2014 | Webb | H04W 72/1231 375/133 |
| 2015/0080000 A1* | 3/2015 | Webb | H04W 52/0238 455/450 |
| 2015/0304148 A1* | 10/2015 | Vermani | H04L 5/0048 375/340 |
| 2018/0054740 A1* | 2/2018 | Furuichi | H04W 16/14 |
| 2019/0349426 A1* | 11/2019 | Smith | H04L 67/104 |
| 2020/0343937 A1* | 10/2020 | Mu | H04B 1/7097 |

* cited by examiner

1325 — When The Channel Hopping Data Comprises The Null Value, Looking Up A Previously Stored Transmit Power Of The TVWS Base Station And Computing The Secret Key By Computing A First Difference Between The Previously Stored Transmit Power And A Measured Receiving Power Associated With The Ack Message At The IoT Device 1330 — When The Channel Hopping Data Comprises The Transmit Power Of The TVWS Base Station, Computing The Secret Key By Computing A Second Difference Between The Transmit Power Received In The Channel Hopping Data And The Measured Receiving Power Associated With The Ack Message At The IoT Device 1335 — When The Channel Hopping Data Comprises The New Parameter, Computing The Secret Key By Computing A Third Difference Between The Previously Stored Transmit Power And The Measured Receiving Power Associated With The Ack Message At The IoT Device Plus A Value Included As The New Parameter

*Figure 13B*

SECURE WIRELESS IOT PLATFORM

BACKGROUND

There are many types of wireless communication systems currently available, including radio, cellular, Bluetooth, WiFi, and television (TV) wireless. The range of broadcast coverage can vary based on the type of wireless communication. For example, class 3 Bluetooth transmits with a range fewer than 10 meters, while a cellphone can reach a cell tower almost 45 miles away. Televisions, like radios, operate on a range of frequencies to which corresponding devices can tune for station broadcasting. TV wireless operates mostly on a very high frequency (VHF) and ultra-high frequency (UHF) bands. VHF bands occupy frequencies ranging from 54 to 216 MHz, while the UHF band spans frequencies between 470 and 700 MHz. These frequencies, and thus corresponding channels, require users to register their devices and license the channel(s) that they wish to occupy. Licensing fees become increasingly expensive depending on the value of the channel a user wishes to use.

To avoid interference between television stations operating on the same or adjacent channels, the television stations are typically operated in geographically isolated areas. In some cases, especially in rural areas with low population density, there are portions of unused frequency spectrum on which a television station could operate but does not. The unused frequencies, found between occupied channels, are referred to as white spaces. Across the globe, efforts have been made to make the TV white space (TVWS) band available for unlicensed radio transmitters to use and operate, as well as to establish standards of use. The typical range for a device operating in the TVWS band can extend up to 50 kilometers, which is significantly longer than WiFi or Bluetooth.

There are several factors associated with the TVWS band that users must consider depending on the use type and content being transmitted. For example, because the devices operating on the TVWS band are unlicensed, and thus the length of time each device is operating is variable and not pre-determined, the availability of the TVWS frequencies is dynamically changing. This poses an obstacle to using the TVWS, as extra coordination efforts are employed to ensure that the channel a device will be operating on is available in the geographic location and timeframe a user is wanting to use it.

Some conventional wireless communications between a transmitter and receiver, for example, utilize the channel reciprocity between the two devices to facilitate the signal transmission. Channel reciprocity is the condition in which the wireless channel experienced by a signal from the transmitter to the receiver is the same as the channel experienced by a signal from the receiver to the transmitter. Therefore, the signal strength of the received signal can be used as a shared key (also referred to as a secret key) between the two devices to ensure proper transmission and reception of a data packet. Specifically, when the transmitter sends a packet to the receiver, the receiver measures the signal strength of the received signal. The receiver sends an acknowledgement back. The transmitter measures the received signal strength for the acknowledgement. Since the two numbers should be equal by the reciprocity principle, this number can be used as a shared key.

However, in the TVWS, this configuration is not feasible. TVWS radios, specifically when deployed in a station-client method, have different transmit powers on the transmitter and the receiver devices. Since the station has access to more power sources, it can transmit at a higher power than the client. As a result, even though the channel between them is the same, the actual received signal strength is higher on the client than the received signal strength on the receiver. As a result, the received signal strength itself is not the same for the two devices, and hence they will end up having different values for the shared key, preventing any communication.

Furthermore, like all wireless networks, the TVWS is a broadcast communication network, where every device can listen to the signal transmitted by another device. While the broadcast nature of the TVWS medium provides many advantages, it presents unique security challenges as well. Specifically, consider a communication between two devices, where one device acts as a transmitter and the other as a receiver. When the transmitter transmits the signal, an adversary can transmit a parallel signal to the receiver on the same frequency at the same time. This allows the adversary to corrupt the signal received by the receiver, and hence deny service. Such attacks are called denial of service attacks.

Given the increasing use of wireless communication systems for monitoring critical infrastructure like power grids, telephone lines, etc., denial of service attacks can have crippling effects. Therefore, there exists a real threat of an attacker compromising a transmission, for example, by disabling the power grid infrastructure monitoring and using the lack of communication to physically attack the power grid. Such attacks would have disastrous consequences.

In some cases, for other types of wireless communication networks, a technique for channel hopping has been employed to offer an increase in security. Channel hopping involves dynamically changing the frequency on which a device or a pair of devices are operating. Thus, an attacker would not as easily be able to determine the frequency on which the transmission is being sent or received. However, because of the dynamically changing access to the frequencies available in the TVWS band, traditional channel hopping is not workable. For example, if a device is currently transmitting at a particular frequency, the next frequency to which the device will "hop" might be unavailable. For example, in existing approaches, including those used for Bluetooth, a fixed hopping pattern is employed. However, because the availability of channels is dynamic, a fixed hopping pattern might encounter unavailable channels. As a result, the communication link between the devices will break down.

Thus, although TVWS presents many advantages such as little to no cost and the ability to operate in long-range, rural areas, there are some obstacles to using TVWS, such as device asymmetry and unpredictable channel availability. Additionally, the TVWS is still subject to security attacks. Consequently, there is a persistent and on-going need to improve how the TVWS band is used for communications.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., hardware storage devices), and methods related to providing a secure channel hopping platform for transmitting or receiving messages over a television whitespace (TVWS) spectrum.

In some embodiments, a message is received from a client device. The message is received over a first channel in the TVWS spectrum and includes a transmit power of the client device used to transmit the message. After receiving the message, a receiving power, which is associated with receiving the message, is measured. Then, a transmission loss associated with the message is dynamically computed by computing a difference between the transmit power and the receiving power. The transmission loss is selected to operate as a secret key for channel hopping.

The secret key is then used to select a second channel in the TVWS spectrum. A determination is made as to whether the second channel is free. If the second channel is determined to be free, the second channel is selected to be the new hopping channel. On the other hand, if the second channel is not free, a third channel is selected in the TVWS spectrum using a combination of the secret key and a new parameter. Upon determining the third channel is free, the third channel is selected as the new hopping channel. Once the new hopping channel (e.g., the second or third channel) is selected, an acknowledgement (Ack) message is generated, where the Ack message is structured to include channel hopping data. When the second channel is selected as the new hopping channel, (i) the channel hopping data is structured to include a transmit power of the computer system used to transmit the Ack message, or (ii) the channel hopping data is null. When the third channel is selected as the new hopping channel, the channel hopping data includes at least the new parameter. Note, the channel hopping data does not indicate which channel was actually selected. The Ack message is then transmitted to the client device, and a transition event occurs in which the computer system transitions to the new hopping channel in preparation to receive a new message from the client device (e.g., over the new hopping channel).

In some embodiments, an Internet-of-Things (IoT) device provides a secure channel hopping platform for transmitting or receiving messages over the TVWS spectrum. For instance, the IoT device transmits a message to a TVWS base station over a first channel in the TVWS spectrum. The message includes a transmit power of the IoT device used to transmit the message. An Ack message, which includes channel hopping data usable by the IoT device to dynamically compute a new channel in the TVWS spectrum, is received from the TVWS base station. Notably, the new channel is one that the IoT device is to subsequently hop to in order to transmit a new message to the TVWS base station. The channel hopping data includes at least one of: a null value, a transmit power of the TVWS base station used to transmit the Ack message to the IoT device, or a new parameter. The channel hopping data is used to compute a secret key that is used to determine the new channel on which to transmit the new message to the TVWS base station. The IoT device then transmits the new message to the TVWS base station over the new channel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 13B illustrates various attributes of the channel hopping data.

DETAILED DESCRIPTION

Figure 1:
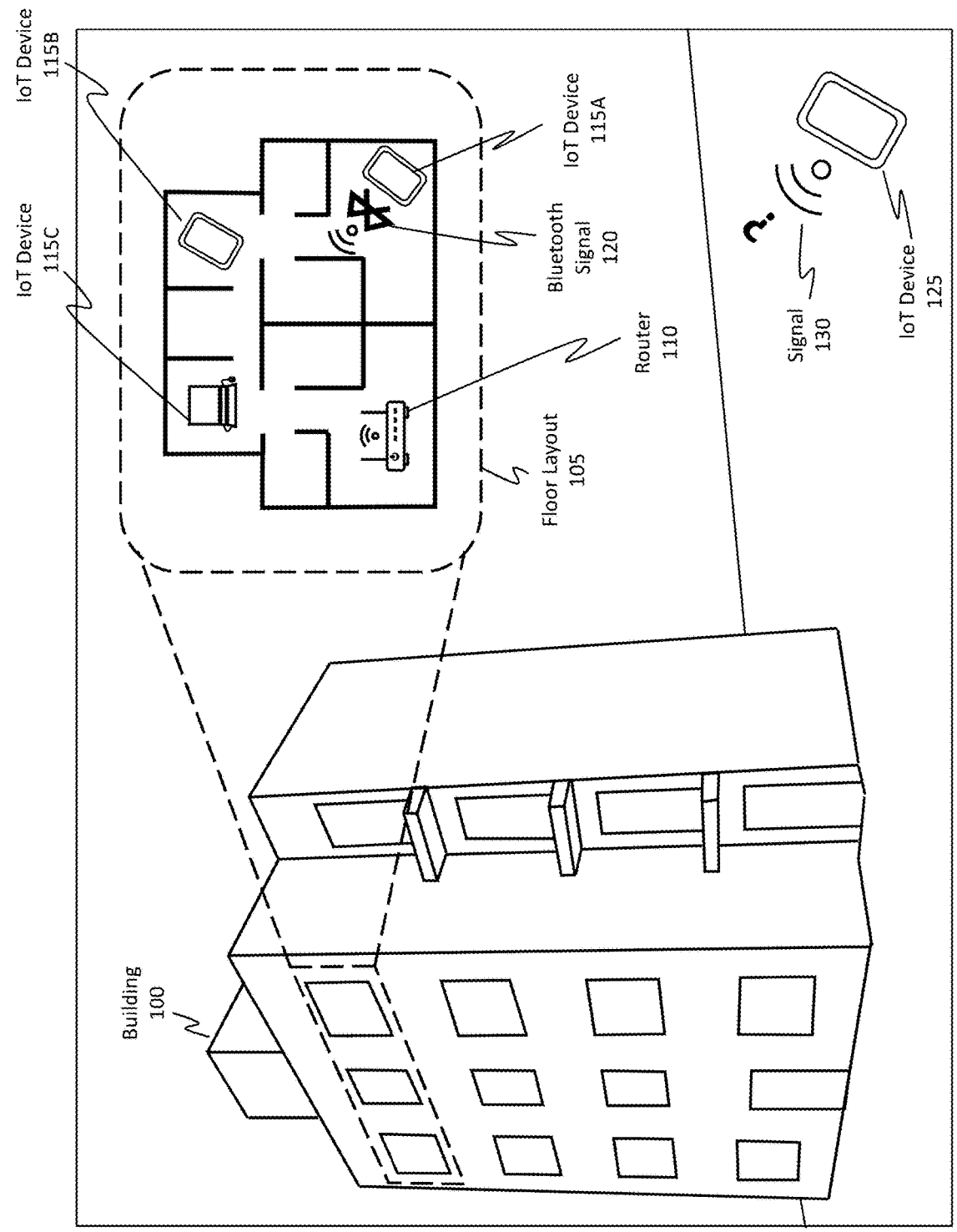
FIG. 1 illustrates an example wireless communications network located in a building where IoT devices on a top floor of the building are able to communicate via a router and/or Bluetooth signal and IoT devices located outside the building are unable to access the wireless signal provided by the router.

Embodiments disclosed herein relate to systems, devices, and methods for providing a secure channel hopping platform for transmitting or receiving messages over a TVWS spectrum.

In some embodiments, a computer system receives a message that includes a transmit power of a client device used to transmit the message over a first channel in the TVWS spectrum. A transmission loss associated with the message is dynamically computed by computing a difference between the transmit power and a measured receiving power associated with receiving the message. The transmission loss is selected to operate as a secret key for channel hopping in order to select a second channel in the TVWS spectrum. If the second channel is determined to be free, the second channel is selected to be the new hopping channel. If the second channel is not free, a third channel is selected as the new hopping channel using a combination of the secret key and a new parameter. Once the new hopping channel is selected, the computer system generates an acknowledgement (Ack) message that is structured to include channel hopping data. The system also transitions to the new hopping channel.

In some embodiments, an IoT device transmits a message to a TVWS base station, where this message includes a transmit power of the IoT device. The IoT device then receives an Ack message from the TVWS base station. The Ack message is structured to include channel hopping data comprising certain data used to compute a new channel. The IoT device uses the channel hopping data to compute a secret key in order to determine the new channel. Subsequently, the IoT device transmits a new message to the TVWS base station over the new channel.

Technical Benefits And Advantages

The disclosed embodiments can be used to solve many of the problems with the traditional technology. Conventional wireless communication relies on channel reciprocity between a transmitting device and a receiving device (i.e. the received signal strength is the same as the transmitted signal strength). For example, a first device will transmit a message to a second device. The second device receives the message and then transmits an acknowledgment message back to the first device. A shared key between the two devices can be based on a received signal strength for an acknowledgment message. In contrast, messages transmitted and received on the TVWS network have different corresponding signal strengths because of device asymmetry. Therefore, using only the received signal strength associated with the acknowledgment message will cause the communication link to break down.

The disclosed embodiments are directed to a secure wireless IoT platform that transmits and receives messages over the TVWS spectrum using a new technique for determining a secret key. This new secret key is based on information included within a message, where that information is used to dynamically compute the secret key. Specifically, the secret key is based, at least in part, on the transmission loss between the two devices. Thus, the shared key (or secret key) between the two device is the transmission loss experienced between the two devices, not the received signal strength only. In this manner, each device is able to maintain up-to-date information at each transmission or reception of a message or acknowledgment message.

Using the transmission loss as the shared key is highly beneficial for several reasons. First, it ensures the communication link does not break down in the event that the received signal strength is higher on one device than the received signal strength for the other device. Second, accommodating for the device asymmetry also provides increased security of the communication between devices. The received power signal can be measured only at the location of the client or the base station. Since the message includes the transmit power and not the received signal power (which is measured at the device location), the transmission loss remains a shared secret between the devices. Since the transmission loss is then also calculated only at a device location and never transmitted over the air, a network attacker cannot intercept a message to discover the transmission loss value, thereby maintaining a beneficial level of data security.

Furthermore, because the transmission loss is dynamically computed, the communication network disclosed herein is able to accommodate for variability in transmitting and/or receiving powers. For example, the base station and/or the client device may have variable access to power sources causing the transmit powers (and corresponding receiving signal strength) to change over time. Because TVWS network communications systems are typically deployed in rural areas, power sources are often unreliable. Thus, the dynamic computation of the transmission loss becomes an increasingly important feature of the disclosed embodiments, particularly for deployment in rural areas. Additionally, the base station and/or client device may be moving throughout an area thereby causing the received signal strengths to vary even if the client and base station individual transmit powers remain constant. Thus, the dynamic computation of the transmission loss further protects the communication link from breaking down, even when access to power sources or the location of either devices is changing over time. This increases the stability and reliability of the communication facilitated by the secure wireless IoT platform disclosed herein.

Communication networks utilizing the TVWS spectrum are subject to many of the same security vulnerabilities as other broadcast networks, such as denial of service attacks. To prevent such attacks, wireless communication networks will employ channel hopping. However, a channel in the TVWS may become unavailable suddenly either because of a denial of service attack or due to another user occupying the channel. Because of the dynamically changing access to frequencies available in the TVWS band and inherent device asymmetry, traditional channel hopping is not feasible.

The disclosed embodiments are directed to a novel technique that modifies the secret key (e.g., a shared key based on transmission loss) shared between the two devices to facilitate random channel hopping with minimal system overhead. The receiver is empowered to modify the shared key by adding a new parameter (e.g., a randomly or pseudo-randomly generated number) to the transmission loss without revealing or exposing the key. This modified shared key is used to determine the next channel to which the client device (or perhaps the TVWS base station) will hop for communication. By practicing the disclosed principles, the disclosed embodiments are able to protect against message interception. Furthermore, the current channel, or the next hopping channel, is very difficult for an attacker to guess because of the random nature of the channel hopping. Additionally, an adversary cannot know the channel strength unless it obtains access to the same location as one of the devices. These features beneficially facilitate an increase in network and data security.

Additionally, the size of the data packet housing the message remains small by including discrete values, instead of complicated algorithms used to facilitate channel hopping. By utilizing data that is already included in a message (e.g., the transmit power) and adapting that data as channel hopping data, the network system functions more efficiently (e.g., decreases system memory allocation and/or decreases processing time) without having to modify large portions of the data packet or existing hardware infrastructure.

Because the disclosed secure wireless IoT platform utilizes unused frequency spaces in the TVWS spectrum, the use of these channels is unlicensed and often requires little to no fees. This is in contrast to very expensive license-allocated frequency spectrums such as cellular networks. Furthermore, because TVWS channels do not require a direct line of sight (LOS), the hardware of the network communication system can be mounted on existing infrastructure and does not require additional towers to be built for mounting purposes. This is especially important in rural areas that do not have longer range service, such as cell service, as low population density does not present a large enough user base to justify expensive cellular towers or other types of satellite connection. Furthermore, TVWS spectrum network communication is typically associated with a high bandwidth and longer-range signal coverage (as compared to typical Bluetooth or WiFi network areas). The unique features of the disclosed embodiments allow a user to capitalize on many of the benefits inherent to using the TVWS spectrum, and offer compounded benefits including communication link stability and reliability by dynamically calculating the transmission loss between devices for use as the shared communication key, data security through a channel hopping facilitated by a secret key, and computing efficiency by leveraging the same message data used for the communication link as the channel hopping data. Costs associated with TVWS are further decreased when compared to similar technologies because TVWS signals can travel farther than WiFi and thus require less infrastructure to cover a WiFi equivalent area.

Wireless Communication Networks

Figure 2:
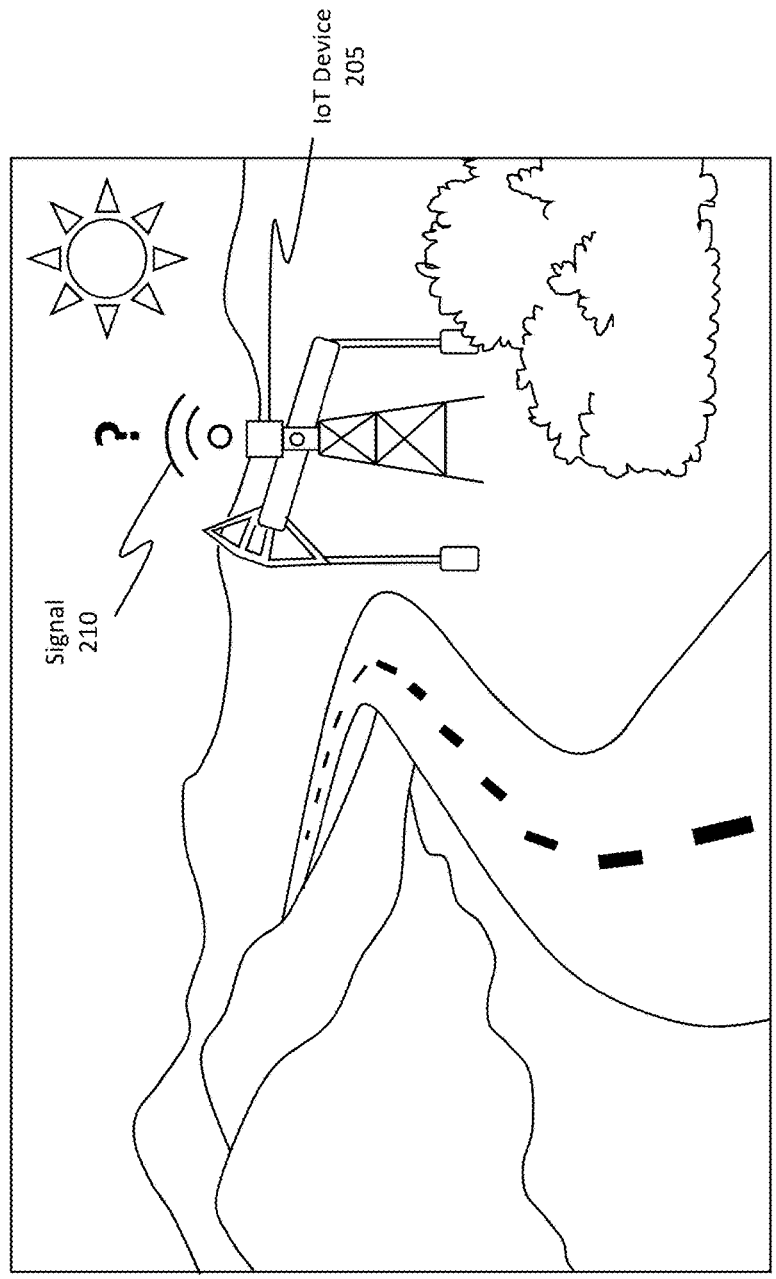
FIG. 2 illustrates an example IoT device located in a rural environment outside the range of a wireless communications network.

Attention will now be directed to FIGS. 1 and 2, which generally illustrate an example of a conventional wireless communication network and its corresponding range of signal reach. A building 100 is shown having a plurality of floors. A top floor, for example, is associated with a specific floor layout 105 comprising a plurality of enclosed and partially enclosed rooms separated by a plurality of walls. In one room located in a lower left-hand corner of the floor layout 105, a router 110 is provided to facilitate the connection of a plurality of IoT devices (e.g., IoT devices 115A, 115B, 115C) to an internet signal. A router (e.g., router 110) directs incoming and outgoing internet traffic on a local network for optimal individual internet device connections and data communications. Some routers are configured to provide WiFi connections which can reach up to 150 feet of signal coverage. Thus, in some instances, router 110 can offer WiFi connectivity for IoT devices 115A, 115B, and 115C which are located within the floor layout 105 of building 100. Furthermore, IoT devices 115A, 115B, and 115C can communicate with each other via a Bluetooth signal 120.

The internet signal provided by the router 110 can penetrate interior walls at a somewhat decreased signal strength, but signal intensity drops off significantly as the distance from the router 110 increases, including traveling through thick, reinforced exterior walls of the building 100 (i.e. line of sight obstruction significantly decreases signal strength). Thus, an IoT device such as IoT device 125 located on a street level outside of building 100 may be looking to connect to a signal 130. However, IoT device 125 would not be able to reach a signal provided by router 110, as it is outside the typical range of signal coverage. Examples of IoT devices include computers, tablets, smartphones, printers, thermostats, smart televisions, or speech enabled smart assistant devices, among others. Any type of device that connects to the internet may be considered an IoT device.

In contrast to FIG. 1, FIG. 2 depicts a rural area 200 having an IoT device 205 mounted on remote machinery equipment. The IoT device 205 searches for a signal 210 but is outside the range of any nearby network connections (e.g., cellular towers, satellite devices, etc.). In other words, the IoT device 205 is transmitting via signal 210 but is not reaching a corresponding receiver. The inability to reach a receiver may be due to prohibitive distance of the transmitter from the receiver and/or the presence of obstructions (e.g., trees, mountains, etc.) to the line of sight between the transmitter and receiver. Reliable, low-cost, and high-bandwidth connectivity is often not available in many rural areas or in many developing countries where either lack of infrastructure or prohibitive costs associated with available internet connection prevent signal use. Thus, worldwide, more than four billion people do not have access to internet connection. This lack of internet connectivity significantly impacts the ability of emerging markets to continue to grow and is associated with barriers to population education and individual and community economy strength.

TVWS Architecture

Figure 3:
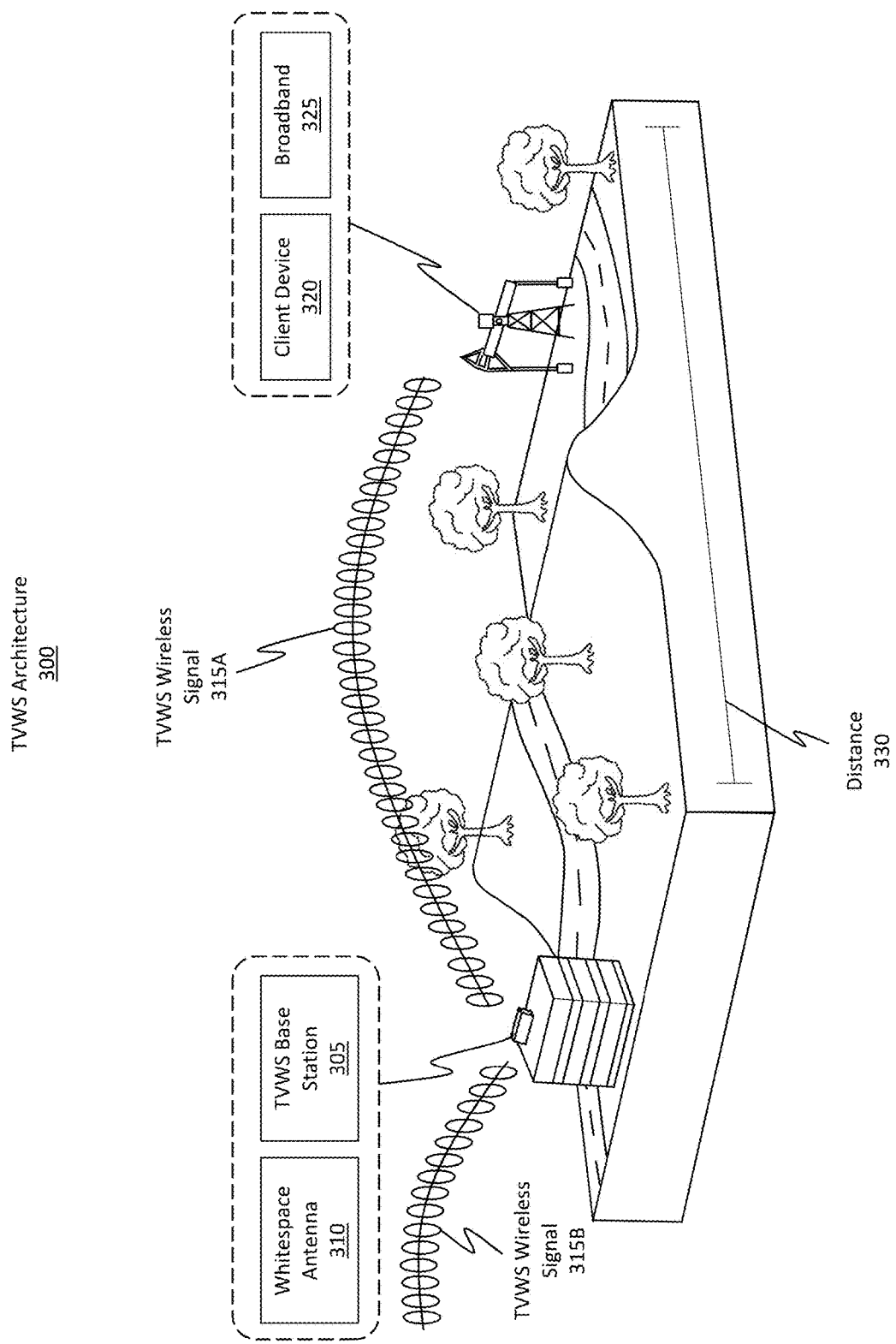
FIG. 3 illustrates an example TVWS architecture configured to facilitate network communication via a TVWS signal between a TVWS base station and an IoT device located in a rural area.
Figure 4:
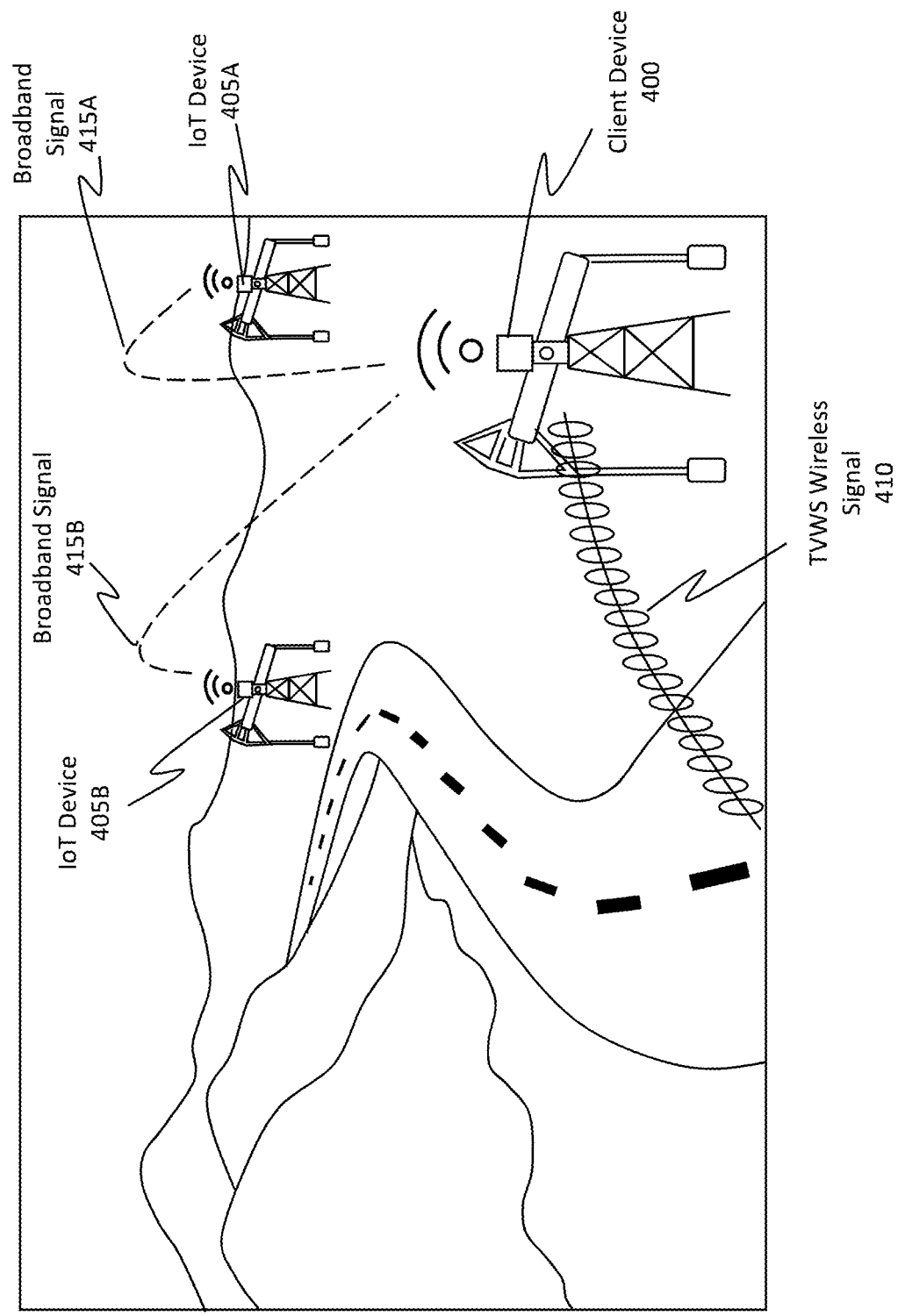
FIG. 4 illustrates a plurality of IoT devices in communication via a broadband signal, where at least one IoT device is a client device which is connected to a base station (not pictured) via a TVWS wireless signal and acts as a tethering device for the other IoT devices to communicate via a wireless network.

Attention will now be directed to FIGS. 3 and 4, which illustrate an example wireless communication network configured as a TVWS architecture 300 to solve some of the aforementioned problems with existing wireless communication technologies. For example, a TVWS base station 305 is shown being fitted with a whitespace antenna 310. The whitespace antenna 310 is capable of receiving a wide range of channels located within the television frequency band, specifically tuning to unused frequencies (i.e. whitespaces). The TVWS base station 305 is configured as a transceiver (i.e. a transmitter and a receiver) by sending or receiving different TVWS wireless signals, such as TVWS wireless signal 315A and TVWS wireless signal 315B. The TVWS base station 305 is able to transmit and receive messages to client devices, such as client device 320. In some embodiments, the TVWS base station 305 comprises multiple transceivers capable of communicating a plurality of signals.

By transmitting the TVWS wireless signal 315A, the TVWS base station 305 is able to communicate with a client device 320 located in a rural region. Unlike IoT device 205 of FIG. 2 which is located outside the range of a receiver, client device 320 is able to send and receive data packets via the TVWS wireless signal 315A because of the TVWS base station 305. The client device 320 is configured to communicate via broadband internet access 325 (i.e. wide bandwidth data transmission). Broadband (e.g., broadband internet access 325) typically refers to internet access that is always on, is faster than dial-up access over traditional services and facilitates wireless communication over multiple channels. In some embodiments, client device 320 further comprises one or more sensors configured to collect and/or store data, where the client device 320 transmits the collected data via data packets using the TVWS wireless signal 315A. For example, the client device 320 could be mounted as a part of an oil rig, farming machinery, inside water infrastructure, on electrical grids end points, or any other location. In this regard, one or more sensors collect data relevant to the infrastructure or machinery to which the client device 320 corresponds.

The TVWS architecture 300 facilitates a method of spectrum use referred to as Dynamic Spectrum Access (DSA) by using the dynamic availability of non-licensed access to a usable spectrum below 1 GHz. Radio frequencies in the TV bands, for example, frequencies ranging from 470 MHz to 698 MHz of the UHF frequencies are long-range. Furthermore, these lower frequencies traverse physical obstacles to provide a non-line-of-sight wireless communication network connection. Thus, TVWS base station 305 can communicate with client device 320 on unused portions of the TV spectrum at long-range distances (e.g., distance 330) for line-of-sight and non-line-of-sight wireless connections. It should be appreciated that distance 330 comprises any distance supported by the TVWS architecture 300. In some embodiments, distance 330 comprises up to 50 km. In some cases, the distance 330 between the two devices is greater than 0.5 miles. It is anticipated that as the technology for TVWS utilization improves, distance 330 will continue to increase in current and future embodiments.

In some embodiments, as shown in FIG. 4, client device 400 acts as tether device to connect a plurality of IoT devices (e.g., IoT devices 405A, 405B) to a base station (e.g., TVWS base station 305 of FIG. 3) via a TVWS wireless signal 410, which is representative of the TVWS wireless signal 315A. This configuration facilitates the use of broadband signal 415A between client device 400 and IoT device 405A and broadband signal 415B between client device 400 and IoT device 405B. In some embodiments, a single base station is in communication with a single client device. Additionally, or alternatively, a single base station is in communication with a plurality of client devices. In some instances, multiple base stations are in communication with multiple client devices, which in turn may be in communication with one or more other IoT devices and/or sensors (i.e. a tethered architecture).

Figure 5:
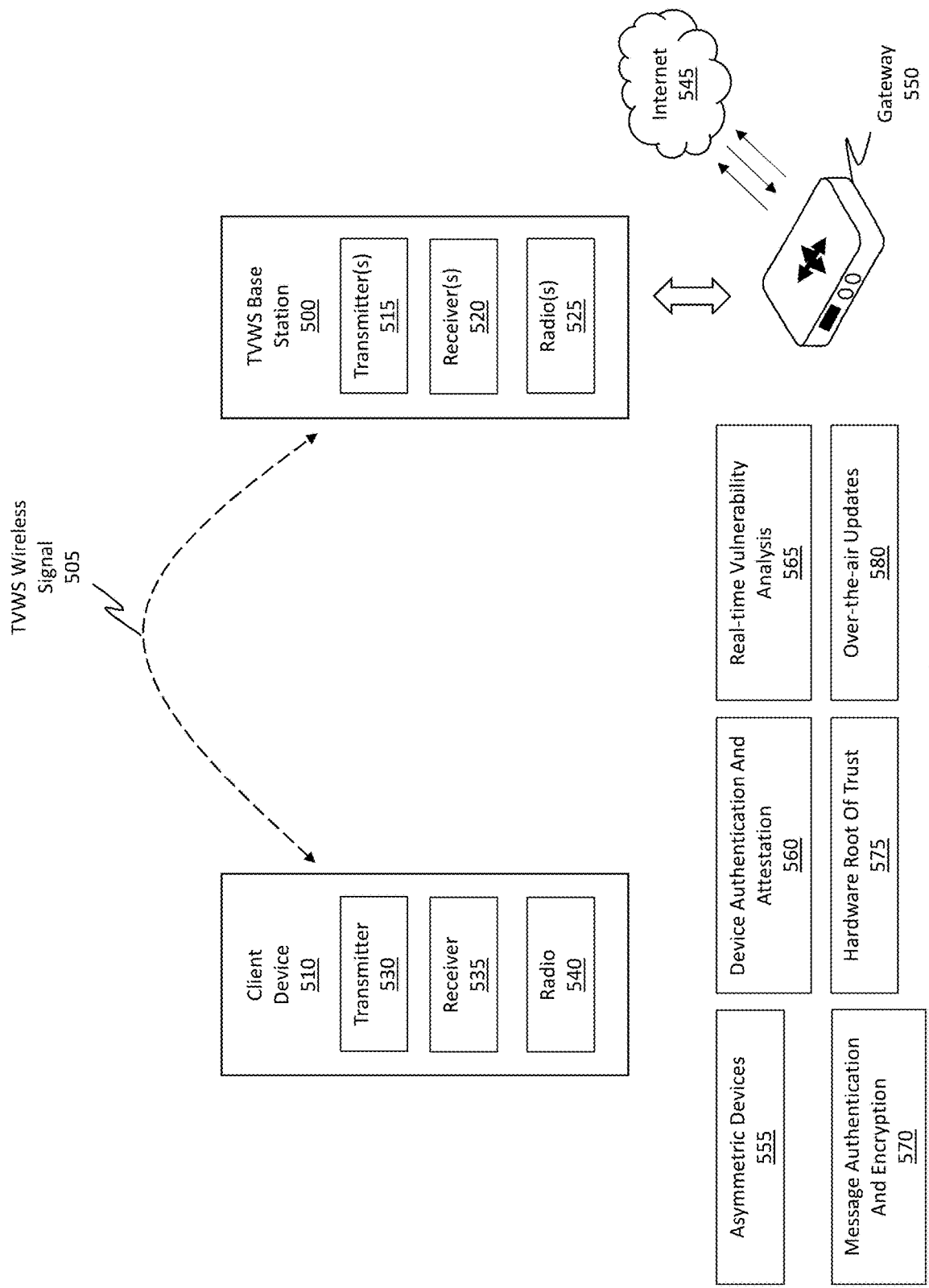
FIG. 5 illustrates an example computing system comprising a client device and a TVWS base station in communication via a TVWS wireless signal having a plurality of beneficial features used to facilitate secure network communications. The TVWS base station is connected to the internet via a gateway device.

Attention will now be directed to FIG. 5 which illustrates an example computing architecture comprising a TVWS base station 500 (e.g., TVWS base station 305 shown in FIG. 3) in communication via a TVWS wireless signal 505 with a client device 510 (e.g., client device 320 shown in FIG. 3). The TVWS wireless signal 505 is a broadband signal that allows for communication and data transfer between the two devices on multiple channels on the TVWS spectrum and is representative of the TVWS wireless signal 410 from FIG. 4. For example, client device 510 can send a data packet or message on a first channel, and the TVWS base station 500 can transmit an acknowledgment message on that first channel. Subsequently, client device 510 can send another data packet or message on a second channel, and the TVWS base station 500 can transmit an acknowledgment message on the second channel after receiving the data packet or message from the client device 510. This process of using different frequencies for wireless communication is often referred to as channel hopping.

The TVWS base station 500 is configured to house one or more transmitter(s) 515, one or more receiver(s) 520, and/or one or more radio(s) 525. For instance, the TVWS base station 500 may include multiple transmitters for simultaneously communicating with multiple client devices. TVWS white space radio comprises location-aware devices and online TVWS databases to provide low-cost broadband access. Similarly, client device 510 is configured to house components for a transmitter 530, a receiver 535, and radio 540. Transmitter(s) 515 and 530 are configured to transmit messages or data packets over one or more channels in the TVWS spectrum (i.e. via the TVWS wireless signal 505). Receiver(s) 520, 535 are configured to receive messages via the TVWS wireless signal 505. For example, TVWS base station 500 can transmit a message to the client device 510 via transmitter(s) 515, and the receiver 535 of the client device 510 receives the message. The client device 510 can transmit a message to the base station 500 via transmitter 530, and the receiver(s) 520 is configured to receive the message.

Radio(s) 525 and 540 are configured to allow the TVWS base station 500 and client device 510 to tune to any frequency in the TV band, specifically unoccupied frequencies (i.e. TV spectrum whitespaces) that do not require licensing for use. The TVWS base station 500 is connected to an internet 545 via a gateway device 550. Gateway device 550 is configured to monitor the dynamic availability of channels in the TVWS spectrum (i.e. unused whitespaces, occupied frequencies, standard licensed frequency bands, etc.) to ensure constant access to the internet 545 and reliable data transmission pathways between the TVWS base station 500 and client device 510.

It should be appreciated that the TVWS base station 500 and the client device 510 may be asymmetric devices (e.g., asymmetric devices 555) meaning that the transmit powers associated with each device are not always equal in magnitude. In instances where the TVWS base station 500 has access to more power sources than the client device 510, the TVWS base station 500 can transmit messages with a transmit power that is higher than a transmit power associated with the client device 510. Thus, disclosed embodiments herein provide systems and methods for preventing communication link breakdown common to asymmetric devices.

The architecture illustrated in FIG. 5 includes a plurality of beneficial features used to facilitate a secure network communication. For example, the architecture can perform device authentication and attestation 560, real-time vulnerability analysis 565, message authentication and encryption 570, hardware root of trust 575, and over-the-air updates 580. It is anticipated that client device 510 has been previously authenticated and thus can freely receive and transmit messages in communication with TVWS base station 500.

However, in some instances, TVWS base station 500 may transmit a message to a new client device. Before the new client device is able to receive the message, it is authenticated to ensure that it is the desired or an approved device on the network. Further, the architecture can perform real-time vulnerability analysis 565. For example, the determination that a particular channel that had previously been used is now unavailable may indicate the presence of a denial of service attack. If a message transmitted by the TVWS base station 500 was never received by client device 510 and/or was received but the TVWS base station 500 did not receive an acknowledgement message from the client device 510, the architecture may determine that the client device 510 or the TVWS base station 500 has been comprised and/or the message was intercepted.

Additionally, to provide increased data security, it should be appreciated that the messages and/or acknowledgment messages and corresponding data packets transmitted via the TVWS wireless signal 505 are encrypted and in some instances, authenticated before opening and/or using data found in the messages. In some embodiments, the over-the-air updates 580 include updated transmit powers and/or updated new parameters used for channel hopping.

Channel Hopping

Figure 6:
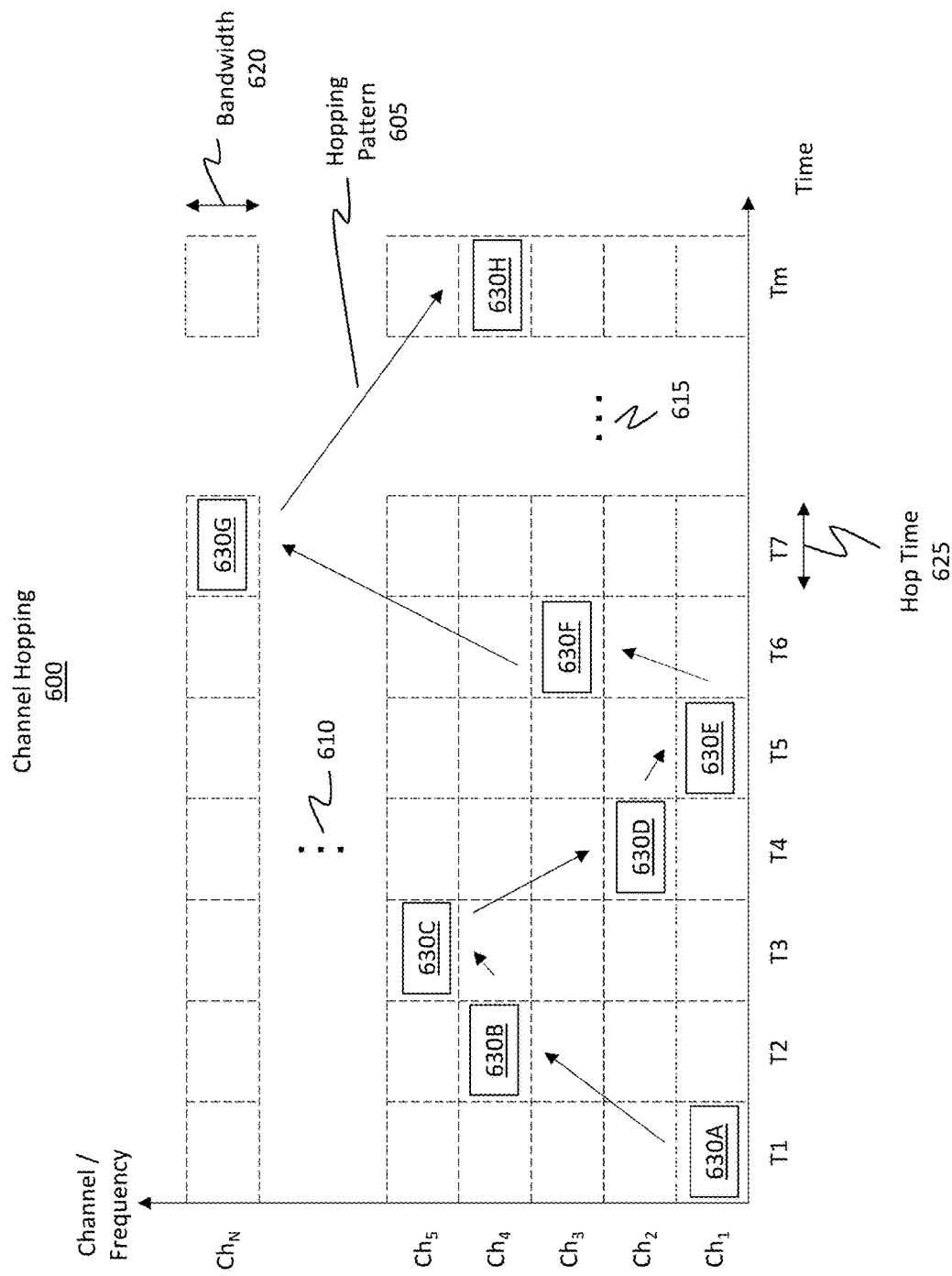
FIG. 6 illustrates an example of channel hopping (i.e. a process of transmitting or receiving one or more data packets on different channels over time based on a hopping pattern).

Attention will now be directed to FIG. 6 which illustrates an example of channel hopping 600 (i.e. a process of transmitting or receiving one or more data packets on different channels over time based on a hopping pattern 605). In some embodiments, the hopping pattern 605 is random. In some embodiments, the hopping pattern 605 is based on a pseudo-random algorithm that accounts for dynamically changing availability of the plurality of channels on the TVWS spectrum.

The framework for channel hopping 600 is depicted as a graph with axes for Channel/Frequency vs. Time. For example, the vertical axis for Channel/Frequency is shown having a plurality of channels (e.g., Ch1, Ch2, Ch3, Ch4, Ch5, Ch6 to ChN), where the ellipsis 610 indicates that there may exist any number of channels available for channel hopping. The horizontal axis for Time is shown having a plurality of times (e.g., T1, T2, T3, T4, T5, T6, T7 to Tm), where the ellipsis 615 indicates any number of time increments on which channel hopping 600 can occur. Each channel corresponds to a frequency or a range of frequencies (e.g., bandwidth 620).

In some embodiments, the bandwidth of each channel is uniform. Additionally, or alternatively, the bandwidths of the channels are unique to each channel. Similarly, each time increment corresponds to a hop time 625. The hop time 625 can refer to the time it takes the system (i) to reconfigure itself to a new channel, (ii) to transmit a new data packet over that new channel, and (iii) to then subsequently transition to a new channel.

Additionally, or alternatively, the hop time 625 refers to the time of a data transmission and/or the time spent changing to the next channel. In some instances, the hop time 625 includes a buffer period before and/or after the data packet transmission and/or before and/or after the system changes to a new channel. In some embodiments, the hop time 625 is uniform for each time increment. Additionally, or alternatively, the hop time 625 may change over time, for example, based on data packet size, distance between the base station and client device, or can change randomly to increase network security/protection against network attacks. It would be harder for an attacker to anticipate the hopping pattern 605 if the hop time 625 associated with each data packet transmission is changing, along with the channel on which the data packet is being transmitted.

As shown in FIG. 6, a plurality of data packets (e.g., packets 630A, 630B, 630C, 630D, 630E, 630F, 630G, and 630H) are shown being transmitted on a plurality of channels. Each data packet is transmitted at a particular time (e.g., data packet 630A is transmitted at T1, where T1 corresponds to a certain hop time 625). An example of hopping pattern 605 is depicted in FIG. 6, where after data packet 630A is transmitted at T1 on Ch1, data packet 630B is transmitted at T2 on Ch4, data packet 630C is transmitted at T3 on Ch5, data packet 630D is transmitted at T4 on Ch2, data packet 630E is transmitted at T5 on Ch1, data packet 630F is transmitted at T6 on Ch3, data packet 630G is transmitted at T7 on ChN, and data packet 630H is transmitted at Tm on Ch4. It should be appreciated that the order of the channels is determined by the parameters of the hopping pattern 605, which may be random, pseudo-random, and/or pre-determined.

In conventional channel hopping between two devices, each device is configured according to a specific algorithm where each device reconfigures itself to transmit and/or receive on the new channel simultaneously and independently. In such instances, the shared key (e.g., a received power) between the devices is often constant or is consistent with the shared algorithm. It should be appreciated that although channel hopping 600 could utilize such a technique, the disclosed embodiments allow for one device to instruct the other device as to which new channel to use.

More specifically, in some embodiments, a first device determines the next channel to use, and the first device informs the second device of the newly chosen next channel. Upon notification of the next channel, the second device can then reconfigure itself to transmit and receive messages on the new channel. Because the shared key (i.e. secret key based, which may be based at least in part on the transmission loss) is changing, the devices beneficially are configured to dynamically and independently reconfigure themselves for communication on new channels. It is anticipated that the channels shown in FIG. 6 are channels found in the TVWS spectrum. Furthermore, it is anticipated that TVWS Architecture 300 of FIG. 3 is configured to employ a channel hopping technique (e.g., channel hopping 600).

Additionally, in some embodiments, to increase data security and/or network security of the channel hopping 600, a machine learning engine and/or machine learning algorithm/model is employed to learn over time the optimal sequence of the hopping pattern 605 to mitigate vulnerabilities in the system and/or to decrease the number of network attacks. In some embodiments, the system could also learn, via the machine learning engine, what the optimal hop time 625 is for each data transmission. Channel hopping 600 could then be optimized for increased network security and data transmission efficiency and reliability.

Improved Channel Hopping Techniques

Figure 7:
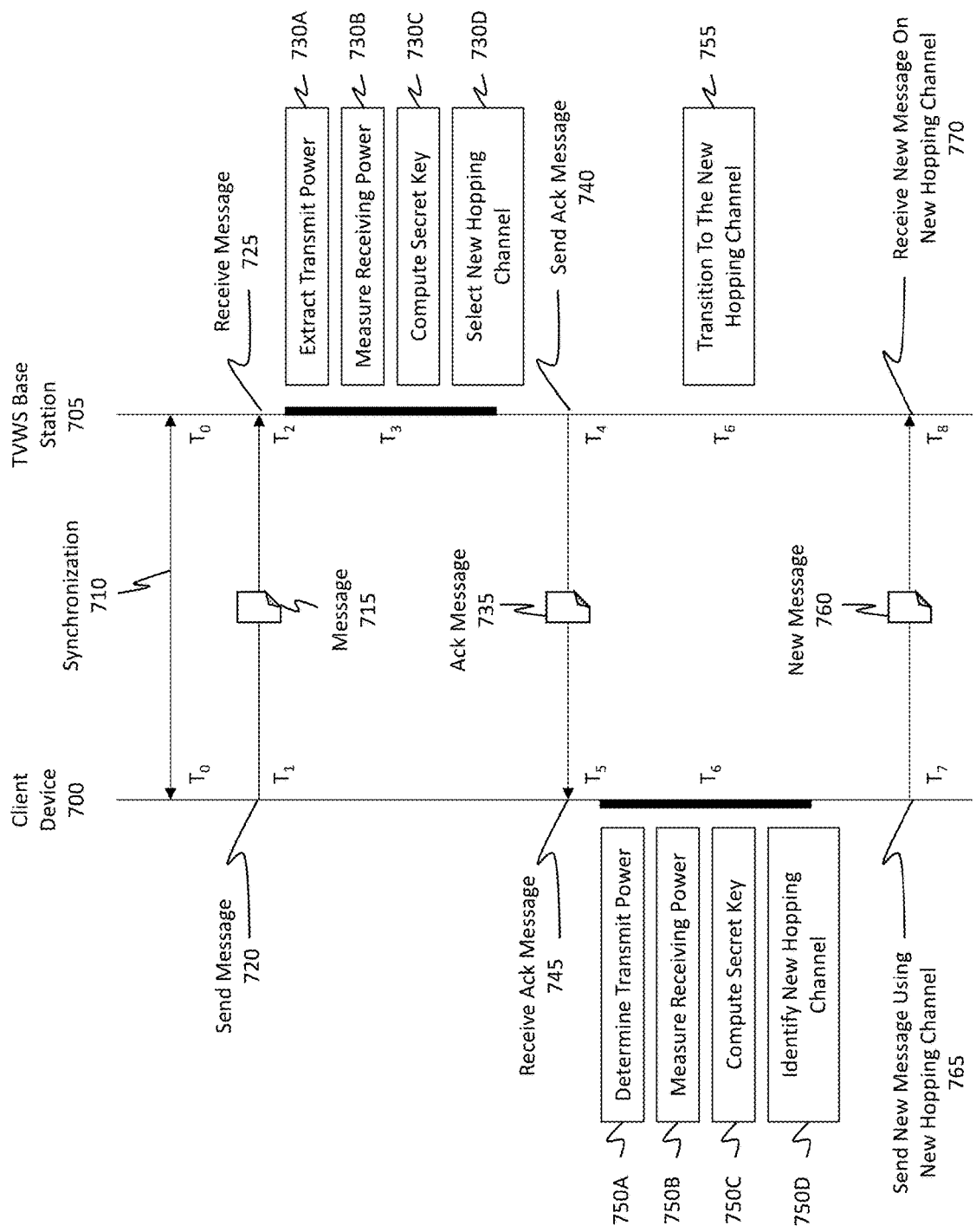
FIG. 7 illustrates an example of a process flow diagram of network communications transmitted and received between a client device and a TVWS base station by dynamically computing a secret key to facilitate secure channel hopping.

Attention will now be directed to FIG. 7 which illustrates an example of a process flow diagram of network communications transmitted and received between a client device 700 (for example, client device 510 shown in FIG. 5) and a TVWS base station 705 (e.g., TVWS base station 500 shown in FIG. 5). At a high level, communication between the two devices is facilitated by dynamically computing a secret key to facilitate secure channel hopping (e.g., channel hopping 600 as illustrated in FIG. 6) through a series of steps performed at a plurality of time intervals.

For example, at T0, the client device 700 and TVWS base station 705 are synchronized (e.g., synchronization 710), where both the client device 700 and the TVWS base station 705 are configured to initially communicate on the same TVWS channel. A first message (e.g., message 715) is sent by the client device 700 (e.g., send message 720) at T1 to the TVWS base station 705. At T2, the TVWS base station 705 receives the message 715 (e.g., receive message 725).

During T3, the TVWS base station 705 performs a plurality of steps to facilitate hopping to a new channel for communication. Specifically, a transmit power associated with the client device 700 sending message 715 to the TVWS base station 705 is included in message 715, and the TVWS base station 705 (or corresponding computer system) extracts the transmit power (e.g., extract transmit power 730A) from message 715. The TVWS base station 705 also measures a receiving power associated with receiving message 715 (e.g., measure receiving power 730B). A secret key is computed (e.g., compute secret key 730C) based on a difference between the measured receiving power and extracted transmit power; further details on this aspect will be provided later. Based on the computed secret key, a new hopping channel is selected (e.g., select new hopping channel 730D).

At T4, the TVWS base station 705 sends an acknowledgment (Ack) message 735 (e.g., send Ack message 740) to the client device 700, which receives the Ack message 735 (e.g., receive Ack message 745). In some embodiments, the Ack message 735 includes a transmit power associated with the TVWS base station 705 transmitting the Ack message 735. During T6, the client device 700 performs a plurality of steps to determine the new hopping channel. For example, the client device 700 (or corresponding computer system) determines the transmit power of the TVWS base station 705 from the Ack message 735 (e.g., determine transmit power 750A). A receiving power associated with receiving the Ack message 735 is measured (e.g., measure receiving power 750B).

Based on a difference between the transmit power and the receiving power, a secret key is computed (e.g., compute secret key 750C). From the secret key, the client device 700 can now identify the new hopping channel (e.g., identify new hopping channel 750D) which is the hopping channel selected by the TVWS base station 705 (e.g., select new hopping channel 730D). Also at T6, the TVWS base station 705 transitions to the new hopping channel (e.g., transition to the new hopping channel 755). It should be appreciated that although shown during T6, the TVWS base station 705 is able to transition to the new hopping channel as soon as the new hopping channel is selected.

After the new hopping channel is identified, the client device is now able to transition to and use the new hopping channel. At T7, the client device 700 is then able to send a new message 760 on the new hopping channel (e.g., send new message using new hopping channel 765). The TVWS base station 705, which has transitioned to the new hopping channel, is able to receive the new message 760 on the new hopping channel (e.g., receive new message on new hopping channel 770). From there, the client device 700 and TVWS base station 705 are able to send and receive messages and Ack messages back and forth on new hopping channels based on the aforementioned process steps. In some embodiments, it is anticipated that the TVWS base station 705 and/or the client device 700 is able to initiate the transition to the new hopping channel.

As shown and described in reference to FIG. 6, the disclosed embodiments are directed to a system and method of use for providing a secure platform for channel hopping, where a first device in a dual-device communication network instructs a second device on which new hopping channel to transition.

Figure 8:
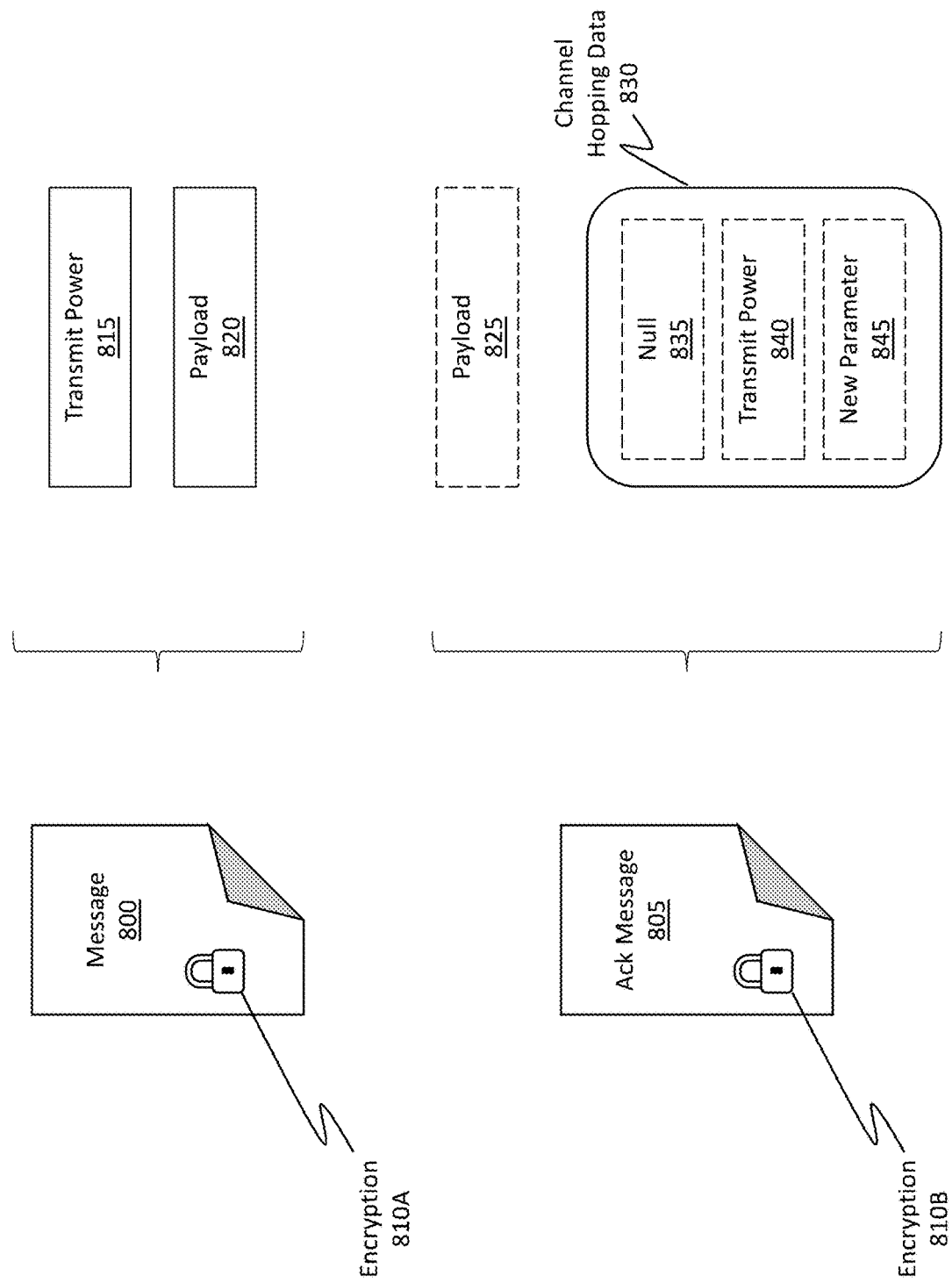
FIG. 8 illustrates a detailed example of a message and an Ack message.

Attention will now be directed to FIG. 8 illustrates a detailed example of a message 800 and an Ack message 805, for example, the messages 715 and 760 and Ack message 735 of FIG. 7, respectively. It should be appreciated that in some embodiments, one or both of the message 800 and Ack message 805 are encrypted (e.g., encryption 810A, 810B). The encryption adds another layer of data security, especially when the data packets (e.g., message 800 and/or Ack message 805) are in transit between devices and are potentially vulnerable to interception. Accordingly, in some embodiments, the message received from the client device and/or the Ack message sent to the client device is/are an encrypted message.

In some embodiments, message 800 is configured to include a transmit power 815 associated with transmitting the message 800. Typically, the transmit power 815 is a transmit power associated with the client device (e.g., client device 700 of FIG. 7) transmitting a message to a TVWS base station. The message 800 also includes at least a payload 820. It should be appreciated that the transmit power 815 is included in one or more locations of the message 800, for example, the transmit power 815 may be included in the payload 820, the preamble, the header, or the body of the message 800. In some embodiments, Ack message 805 optionally includes a payload 825. The Ack message 805 is configured to include channel hopping data 830 which is read by a device to facilitate transitioning the device to a new hopping channel.

In some embodiments, the channel hopping data 830 includes one or more of a null 835 value, a transmit power 840, or a new parameter 845. The null 835 value is a value where, upon receipt of the Ack message 805 by a client device, triggers the client device to look up a previously stored transmit power value in order to compute a secret key for channel hopping. In some embodiments, the channel hopping data 830 includes a transmit power 840, a new parameter 845 or a combination of the transmit power 840 and the new parameter 845.

In some embodiments, the new parameter 845 is a random value or pseudo-randomly generated value. The inclusion of the transmit power 840 only or the combination of the transmit power 840 and the new parameter 845 beneficially maintains a level of data security of the Ack message 805 and of the network security of the communication link between devices. Since the secret key is used to instruct a device on the newly selected hopping channel, and the secret key is computed from a difference between the transmit power 815, 840 and a receiving power associated with receiving the message 800 or Ack message 805, an attacker would not be able to determine the next the hopping channel solely based on the channel hopping data 830. The secret key is computed at the device location, not during a transmission. Further details regarding the new parameter 845 will be provided momentarily.

Figure 9:
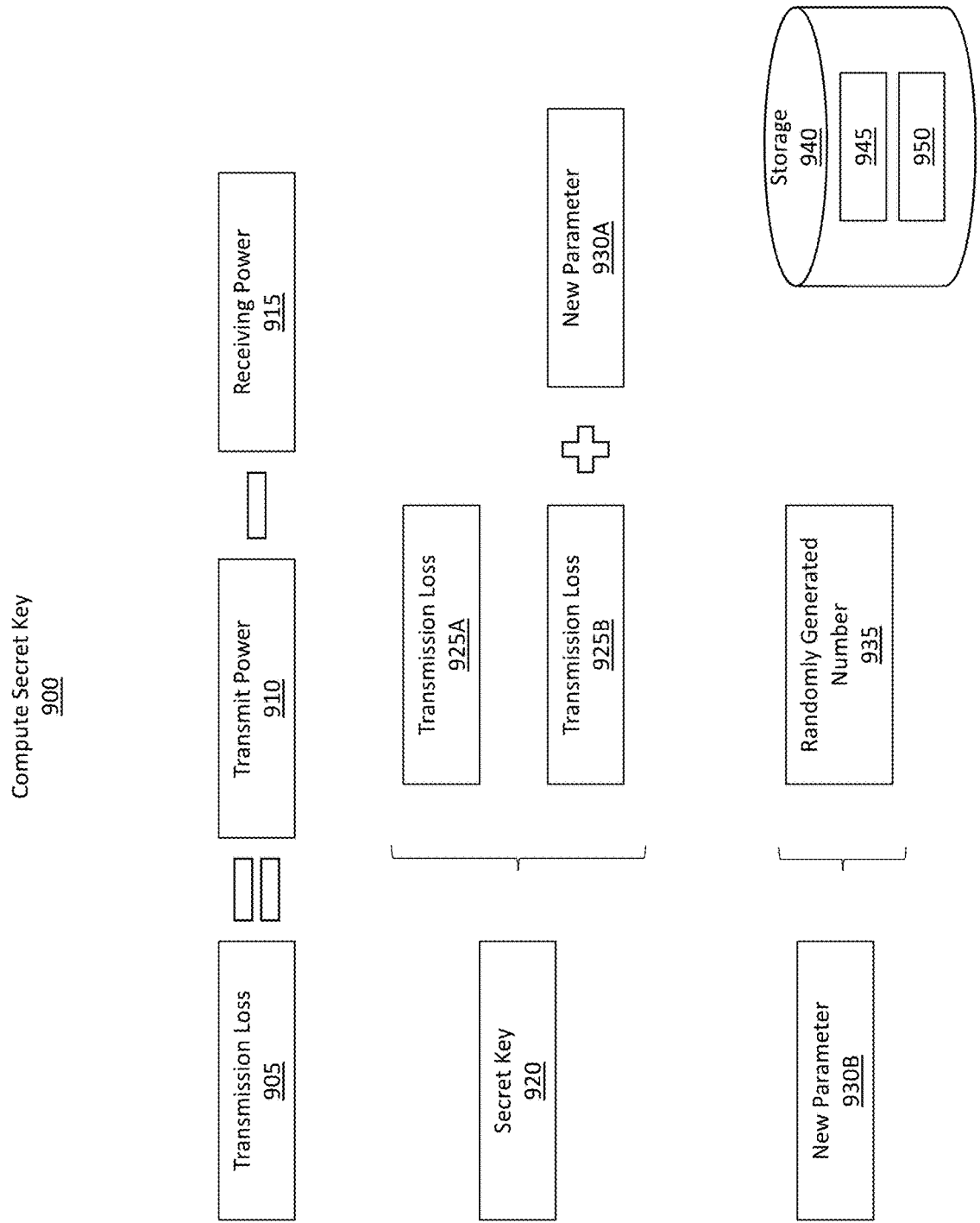
FIG. 9 illustrates various example embodiments employed to compute a secret key.

Attention will now be directed to FIG. 9 which illustrates various example embodiments employed to compute a secret key 900 (for example, compute secret key 730C as shown in FIG. 7). In some embodiments, the secret key correlates to the transmission loss 905 which is determined by calculating a difference between a transmit power 910 associated with transmitting a message and a receiving power 915 associated with receiving the message. The secret key 920 is based on one or more of the following: the transmission loss 925A by itself (which is representative of the transmission loss 905) or, alternatively, the transmission loss 925B (which is also representative of the transmission loss 905) plus a new parameter 930A, which is representative of the new parameter 845 from FIG. 8. In some embodiments, the new parameter 930B, which is representative of the new parameter 930A, is configured as a randomly generated number 935, and where, in some instances, the next hopping channel is based on a combination of the dynamically computed transmission loss and the randomly generated number 935.

In cases where a message or Ack message includes a null value or a new parameter (e.g., parameter 930B) only, a storage 940 is provided as part of a computer system. For example, storage 940 is configured to store previous values (e.g., data 945, 950) of the transmit power, the receiving power, new parameters, transmission loss, or other data relevant to computing the secret key (e.g., compute secret key 900). It should be appreciated that in some embodiments, the new hopping channel is not included in the Ack message. Additionally, it should be appreciated that in some embodiments, the new parameter does not occupy an additional field in the preamble of the message or Ack message. In such embodiments, the new parameter is added or subtracted to the transmit power such that the transmit power itself is automatically updated.

Selecting A New Hopping Channel

Figure 10:
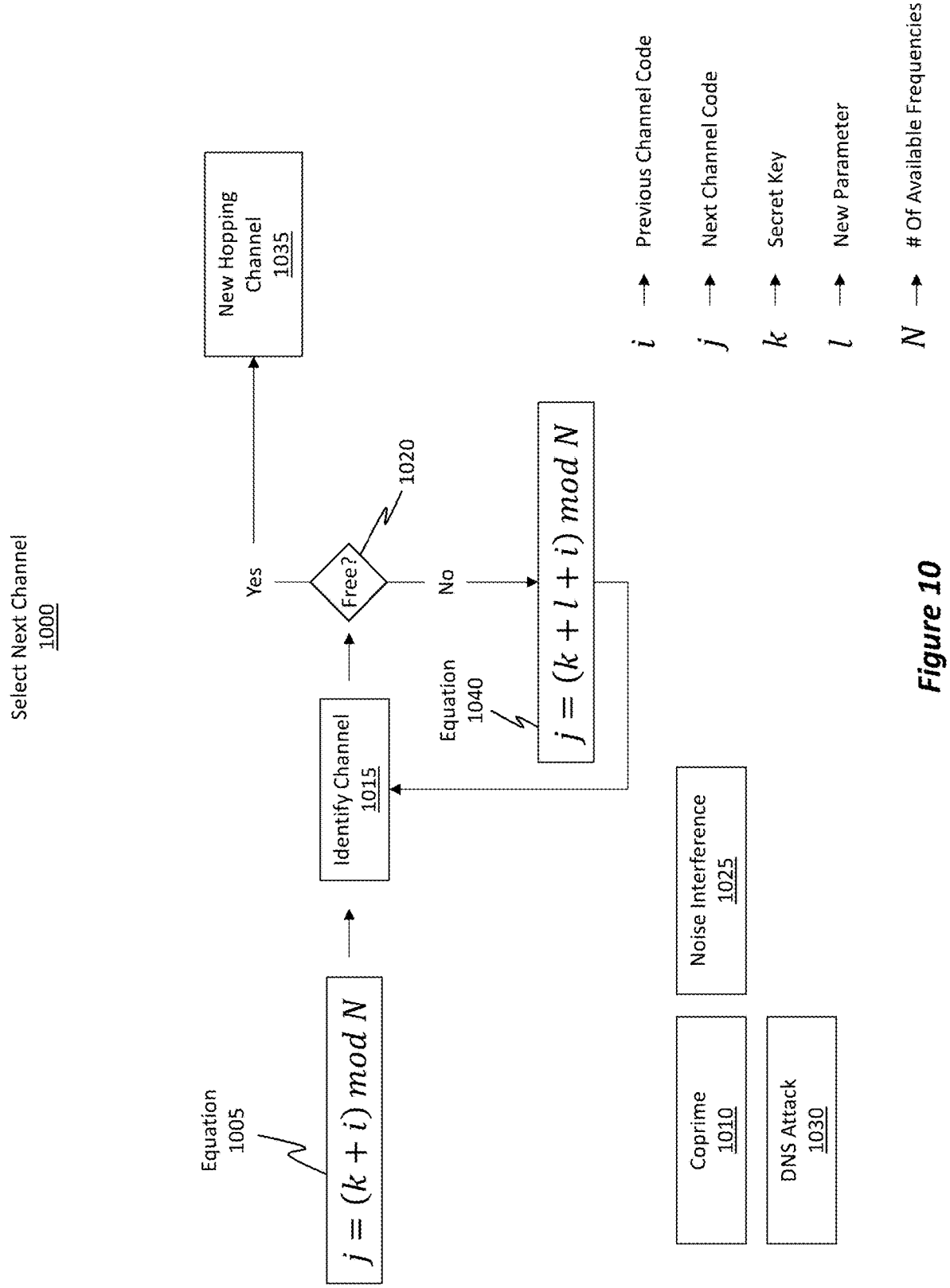
FIG. 10 illustrates some example methods for selecting a next channel during channel hopping.

Attention will now be directed to FIG. 10 which illustrates some example methods for selecting a next channel 1000 during channel hopping (e.g., selecting a new hopping channel 730D shown in FIG. 7). Initially, a next channel code "j" is determined by the following equation 1005:

$$j=(k+i) \bmod N$$

where "k" is a secret key shared between two or more network nodes, "i" is a previous channel code, and "N" is the number of available frequencies. Equation 1005 is beneficially configured such that the resulting "j" values correspond at least once to each one of the available frequencies. In some embodiments, "k" and "N" are configured to be coprime 1010 such that each one of the "N" number of frequencies are cycled through, without skipping intermediary frequencies. Benefits of cycling through the entire range of available frequencies include facilitating an increase in data security. For example, if the system cycles through only a subset of channels, then some algorithmic information is essentially leaked to a potential attacker. For the next channel selection to be random, "j" channel codes correspond to "N" number of available frequencies. Thus, by using the entire spectrum of available frequencies, a malicious attacker is prevented from guessing which subsequent channel the system will identify as the next hopping channel. In embodiments where "k" and "N" are not coprime, a subset of the available frequencies is cycled through for determining the next channel.

Once a channel has been identified (e.g., identify channel 1015), the embodiments determine whether that channel is free or not free (i.e. logic gate "Free?" 1020). Logic gate "Free?" 1020 is facilitated by determining if the identified channel includes noise interference 1025. The noise interference 1025 may be the result of a denial of service attack (e.g., DNS attack 1030) or that another user is occupying that channel. In some embodiments, the identified channel is determined to be "free" by querying a fixed public database that maintains real-time data for channel availability. In some cases, the identified channel is determined to be free by sensing whether the channel is currently occupied. If the channel is determined to be free (e.g., "yes"), then that channel is selected as the new hopping channel 1035. If the channel is determined to not be free (e.g., "no") then equation 1005 is modified to become equation 1040. Equation 1040 is modified with the addition of a new parameter "l" which is representative of new parameter 930A, 930B of FIG. 9. Equation 1040 is modified to be the following:

$$j=(k+l+i) \bmod N$$

where "l" is the new parameter.

Figure 11:
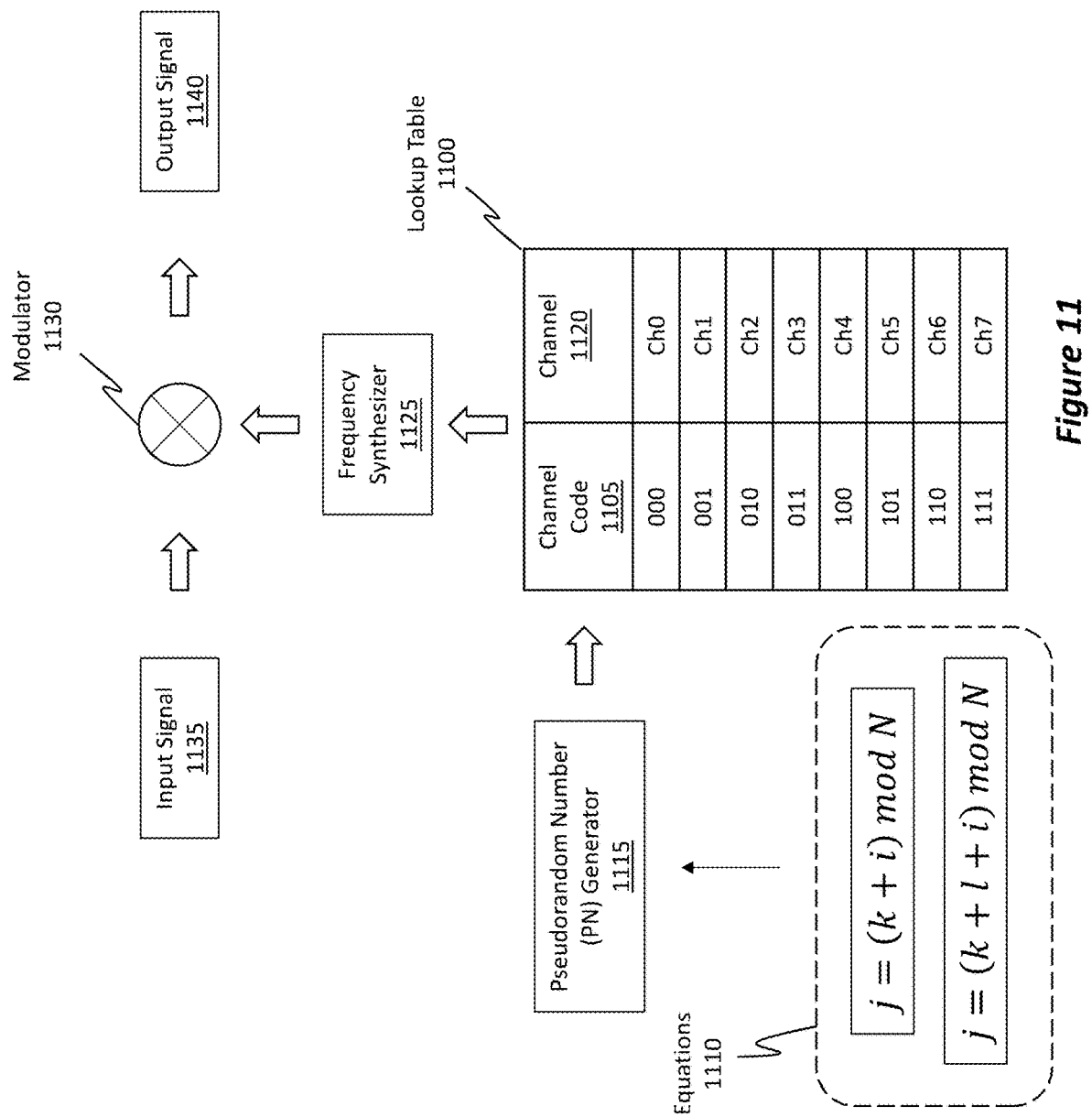
FIG. 11 illustrates an example process flow diagram for transitioning to a new channel by selecting a channel based on a channel code determined from one or more equations and a pseudorandom number generator. The channel is correlated with a frequency or range of frequencies to which a modulator is able to transition from an input signal to an output signal.

Attention will now be directed to FIG. 11 which illustrates an example process flow diagram for transitioning to a new channel using a channel look up table (e.g., look up table 1100). The system is able to transition to the next channel by selecting a channel based on a channel code (e.g., from channel code 1105, such as the channel code "j" from FIG. 10) determined from one or more equations (e.g., equations 1110, such as the equations 1005 and 1040 from FIG. 10) and a pseudorandom number (PN) generator (e.g., PN generator 1115). Once the channel (e.g., from channels 1125) is selected using the PN generator 1115, the equations 1110, and the lookup table 1100, the a frequency synthesizer 1200125 feeds the selected channel to a modulator 1130, which modulates an input signal 1135 so that the input signal 1135 is carried using the selected channel/frequency, thereby generating the output signal 1140, which is now prepared for transmittal across the selected channel/frequency.

In some embodiments, equations 1110 are representative of equations 1005 and 1040 of FIG. 10. Referring to equations 1110 in FIG. 11, "j" is calculated and corresponds to a channel code 1105 (e.g., 000, 001, 010, 011, 100, 101, 110, 111 in the case where the channel code 1105 is a three bit value, of course other bit values may be used), where each channel code corresponds to a specific channel 1120 (e.g., Ch0, Ch1, Ch2, Ch3, Ch4, Ch5, Ch6, and Ch7), respectively.

In some embodiments, channel code 1105 comprises a 3 bit code identifier (or any other bit value) resulting in 8 possible combinations (i.e. resulting in 8 possible corresponding channels). However, it should be appreciated that the channel code 1105 may comprise any number of bits to produce any number of code combinations such that any number of channels may be selected as a next hopping channel. In some embodiments, channel 1120 is representative of channels illustrated in FIG. 6 (e.g., Ch1-ChN).

In some embodiments, parameter "l" is generated as a random number by a random or pseudo-random number generator to facilitate a random channel hopping pattern (e.g., channel hopping pattern 605 from FIG. 6). Based on the channel code 1105 (e.g., determined through a corresponding value for "j"), a channel 1120 is selected. A frequency synthesizer 1200125 is then able to translate the channel into the corresponding frequency or range of frequencies associated with a particular channel (e.g., Ch0). Based on output from the frequency synthesizer 1200125, a modulator 1130 is able to modulate an input signal 1135 so the input signal 1135 will be transmitted via the selected channel, thereby producing an output signal 1140, which transmits the message using the selected hopping channel, which was determined by equations 1110.

TVWS Base Station Methods

Figure 12A:
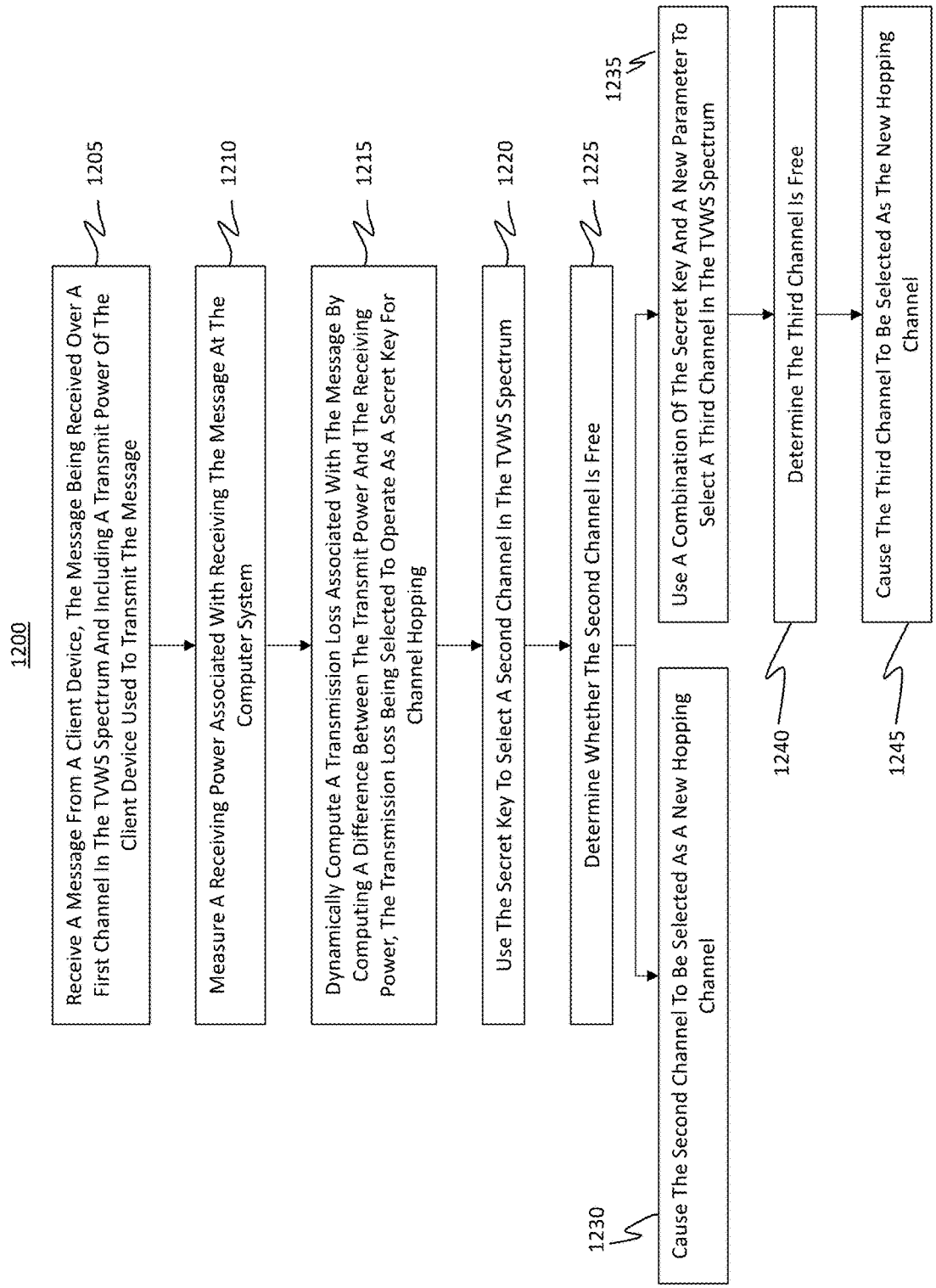
FIG. 12A illustrates an example method associated with acts for providing a secure channel hopping platform for transmitting or receiving messages over a TVWS spectrum.
Figure 12B:
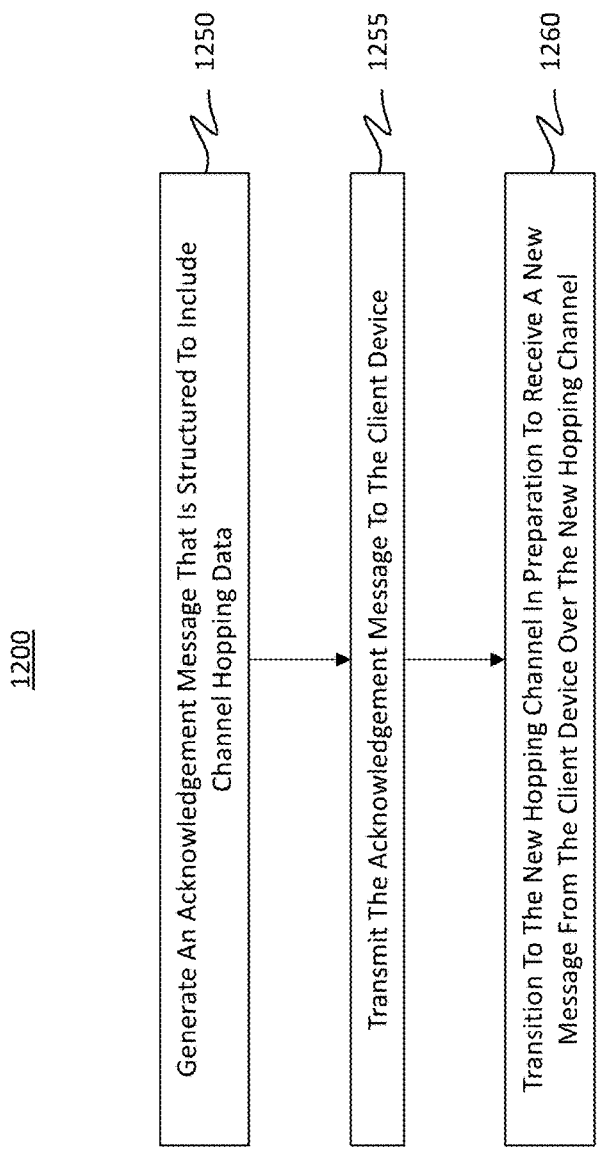
FIG. 12B illustrates an example method associated with acts for generating and transmitting an acknowledgment (Ack) over a new hopping channel. The Ack message is structured to include channel hopping data.
Figure 12C:
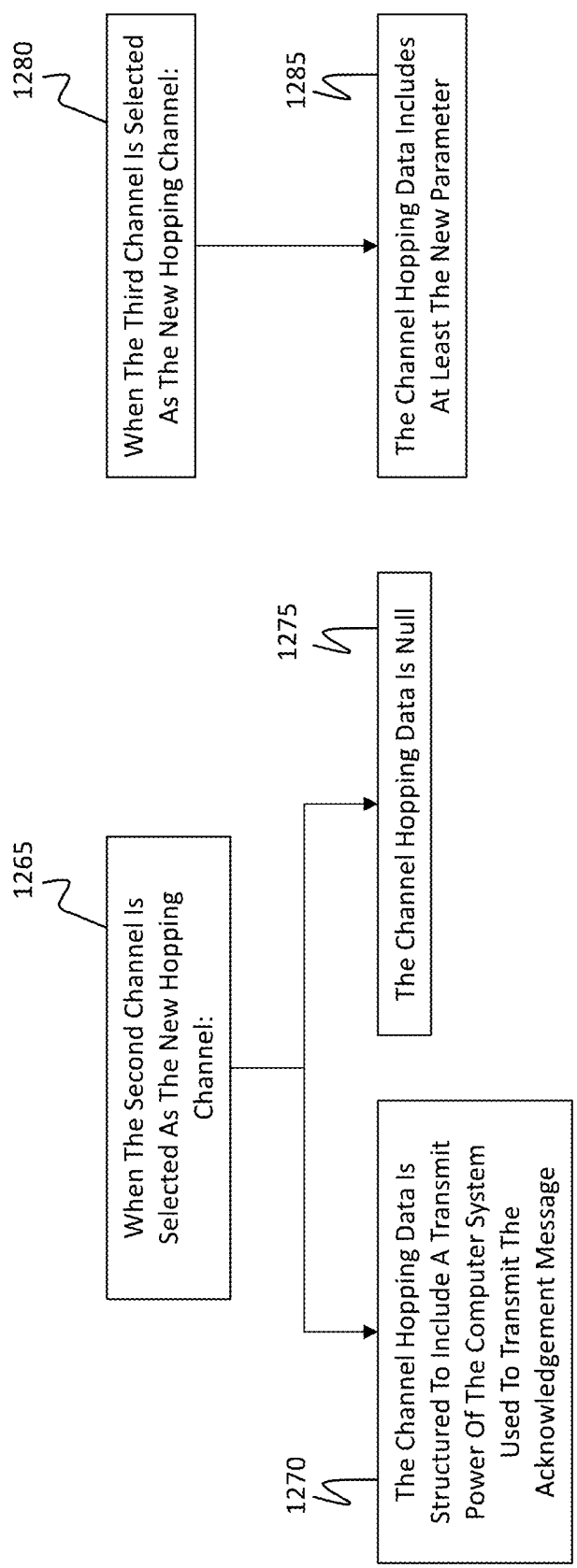
FIG. 12C illustrates various example techniques for selecting the new hopping channel and data included in the channel hopping data.

Attention will now be directed to FIGS. 12A-12C which illustrate various example methods associated with the disclosed embodiments. For example, FIG. 12A illustrates an example method 1200 associated with acts for providing a secure channel hopping platform for transmitting or receiving messages over a TVWS spectrum. Method 1200 comprises techniques for utilizing the TVWS spectrum for a secure wireless IoT platform by performing at least the operations disclosed in FIGS. 12A, 12B, and 12C. Notably, method 1200 may be performed by a TVWS base station, though it may also conceivably be performed by a client device. Often, the TVWS base station is the master entity that instructs the client device as to which new hopping channel to transition to; however, in some implementations, the client device may be the master device instructions the TVWS base station as to which new hopping channel to transition to.

Method 1200, with reference to components of FIGS. 7-11, is shown as including an act (act 1205) of receiving a message (e.g., receive message 725) from a client device (e.g., client device 700). Here, the message is received over a first channel in the TVWS spectrum and includes a transmit power, which may be extracted (e.g., extract transmit power 730A). The transmit power is that of the client device used to transmit the message. In some cases, the TVWS base station and the client device are asymmetric devices such that the transmit power of the client device is different from the transmit power of the TVWS base station.

In series with act 1205, there is an act (act 1210) of measuring a receiving power associated with receiving the message at the computer system (e.g., measure receiving power 730B). Subsequently, an act (act 1215) is performed to dynamically compute a transmission loss associated with the message by computing a difference between the transmit power and the receiving power. The transmission loss is selected to operate as a secret key for channel hopping (e.g., compute secret key 730C). In some cases, the transmission loss is dynamically computed each time a new message is received from the client device. Once the secret key is computed, an act (act 1220) is performed to use to the secret key to select a second channel in the TVWS spectrum (e.g., select new hopping channel 730D).

An act (act 1225) is performed by which the system determines whether the second channel is free (e.g., logic gate "Free?" 1020 of FIG. 10). If the second channel is free, an act (act 1230) is performed to cause the second channel to be selected as a new hopping channel (e.g., new hopping channel 1035 of FIG. 10).

That is, in some embodiments, the process of using the secret key to select the second channel in the TVWS spectrum is performed using the following algorithm:

$$j = (k+i) \bmod N$$

where j is a next channel code used to select a next hopping channel; k is the secret key; i is a previous channel code used to select the first channel; and N is a number indicating how many frequencies are available.

On the other hand, if the second channel is not free (e.g., perhaps the second channel is not free as a result of a DNS attack occurring on the second channel), a series of acts (acts 1235-1245) are performed. For example, act 1235 is directed to using a combination of the secret key and a new parameter (e.g., new parameter 930A from FIG. 9, such as the "l" term in equation 1040 of FIG. 10) to select a third channel in the TVWS spectrum. That is, in some embodiments, the process of using the combination of the secret key and the new parameter to select the third channel in the TVWS spectrum is performed using the following algorithm:

$$j = (k+l+i) \bmod N$$

where j is a next channel code used to select a next hopping channel; k is the secret key; l is the new parameter; i is a previous channel code used to select the first channel; and N is a number indicating how many frequencies are available. In some cases, k and N are selected to be coprime.

Act 1240 determines that the third channel is free. If it is not free, then a new parameter is selected and the resulting channel is again tested. This process may repeat until a free channel is identified. Then, act 1245 is performed to cause the third channel to be selected as the new hopping channel. In some embodiments, the process of determining whether the second channel or the third channel is free is performed by measuring a noise interference of the second channel or the third channel. In some embodiments, the process of determining whether the second channel, or the third channel, is free is performed by querying a fixed public database housing data about the availability of channels included in a frequency spectrum.

In some embodiments, when the third channel is selected as the new hopping channel, it may be the case that the channel hopping data includes only the new parameter. Alternatively, in some embodiments, when the third channel is selected as the new hopping channel, it may be the case that the channel hopping data includes a combination of the new parameter and the transmit power of the system used to transmit the Ack message. On the other hand, when the second channel is selected as the new hopping channel, it may be the case that the channel hopping data is null such that the client device is triggered to look up a previously computed transmission loss or transmit power.

FIG. 12B continues method 1200 and includes operations associated with acts for generating and transmitting an acknowledgment (Ack) over the new hopping channel selected in either acts 1230 or 1245. The Ack message is structured to include channel hopping data. As shown in FIG. 12B, method 1200 includes an act (act 1250) of generating an acknowledgment message (e.g., Ack message 735) that is structured to include channel hopping data (e.g., channel hopping data 830). An act (act 1255) is performed to transmit the Ack message to the client device. Then, an act (act 1260) includes transitioning to the new hopping channel (e.g., transition to the new hopping channel 755) in preparation to receive a new message (e.g., message 760) from the client device over the new hopping channel.

FIG. 12C illustrates various example embodiments associated with determining what data is to be included in the channel hopping data recited in act 1250. For example, when the second channel is selected as the new hopping channel (act 1265) (e.g., when act 1230 is performed), the channel hopping data is structured to include either a transmit power of the computer system used to transmit the acknowledgment message (act 1270) or the channel hopping data is null (act 1275). Such operations were discussed in more detail with regard to FIG. 8.

When the third channel is selected as the new hopping channel (act 1280) (e.g., when act 1245 is performed), the channel hopping data includes at least the new parameter (act 1285) to ensure that the secret key can be dynamically updated. In some embodiments, act 1285 includes structuring the channel hopping data to include at least the new parameter and a transmit power (e.g., see channel hopping data 830). When only the new parameter is included, then the client device is triggered to automatically look up a previously saved transmit power, such as may be stored in the storage 940 of FIG. 9.

Client Device Methods

Figure 13A:
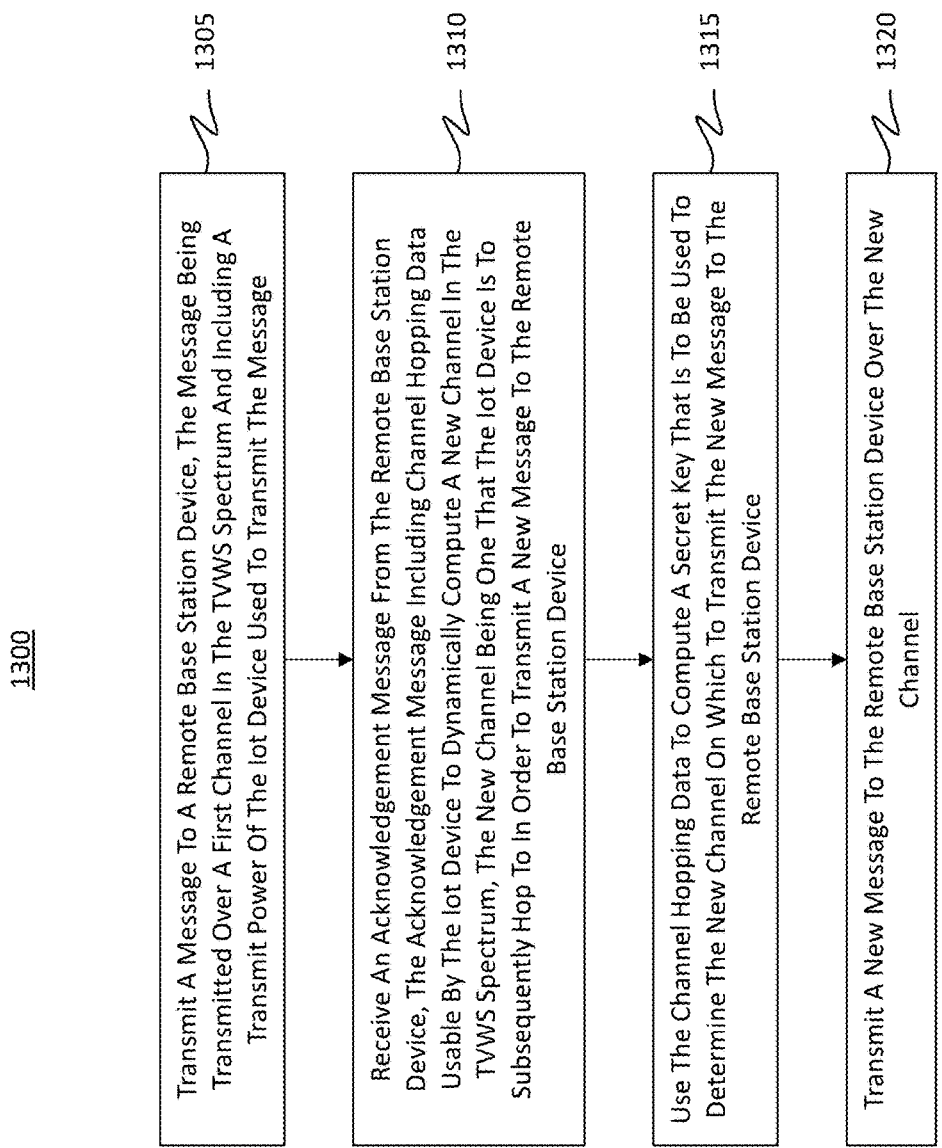
FIG. 13A illustrates an example method associated with acts for transmitting or receiving messages between an IoT device and a remote base station.

FIGS. 13A and 13B correspond to operations that may be performed by a client device, which may be instructed by the TVWS base station regarding which new hopping channel is to be used. FIGS. 13A and 13B generally refer to the components illustrated in FIGS. 7-11 and generally illustrate example methods associated with acts for transmitting or receiving messages between an IoT device (e.g., client device 700) and a remote base station (e.g., TVWS base station 705), from the perspective of the IoT device.

Initially, method 1300 includes an act (act 1305) of transmitting a message (e.g., message 715) to a remote base station (e.g., a TVWS base station) (e.g., send message 720). The message is transmitted over a first channel in the TVWS spectrum and includes a transmit power (e.g., transmit power 815) of the IoT device used to transmit the message.

Next, an act (act 1310) is provided to receive an acknowledgment (Ack) message from the remote base station (e.g., receive Ack message 745). The Ack message (e.g., Ack message 805) includes channel hopping data (e.g., channel hopping data 830) usable by the IoT device to dynamically compute a new channel in the TVWS spectrum (e.g., compute secret key 750C). The new channel is one that the IoT device is to subsequently hop to in order to transmit a new message to the remote base station.

An act (act 1315) is directed to using the channel hopping data to compute the secret key that is to be used to determine the new channel on which to transmit the new message to the remote base station. Additionally, method 1300 includes an act (act 1320) of transmitting the new message to the remote base station over the new channel (e.g., send new message using new hopping channel 765).

FIG. 13B illustrates various example embodiments of various acts associated with FIG. 13A. In some embodiments, method 1300 also includes an act (act 1325) such that when the channel hopping data comprises a null value (e.g., null 835), the IoT client device looks up a previously stored transmit power (e.g., as stored in storage 940) of the TVWS base station. The IoT client device then computes the secret key by computing a first difference between the previously stored transmit power and a measured receiving power associated with the Ack message at the IoT device.

In some embodiments, method 1300 includes an act (act 1330) such that when the channel hopping data comprises the transmit power of the TVWS base station, the secret key is computed by computing a second difference between the transmit power received in the channel hopping data and the measured receiving power associated with the Ack message at the IoT device.

Additionally, or alternatively, in some embodiments, method 1300 includes an act (act 1335) such that when the channel hopping data comprises the new parameter, the computer system computes the secret key by computing a third difference between the previously stored transmit power and the measured receiving power associated with the Ack message at the IoT device plus a value included as the new parameter. For instance, in act 1335, the IoT device may be triggered to utilize the equation 1040 in order to compute the new hopping channel. Notably, both the IoT client device and the TVWS base station retain in memory both the equation 1005 and the equation 1040 from FIG. 10. The embodiments transmit channel hopping data in order to enable one device to dynamically compute which new hopping channel to use in accordance with the disclosed operations.

Example Computer Systems

Figure 14:
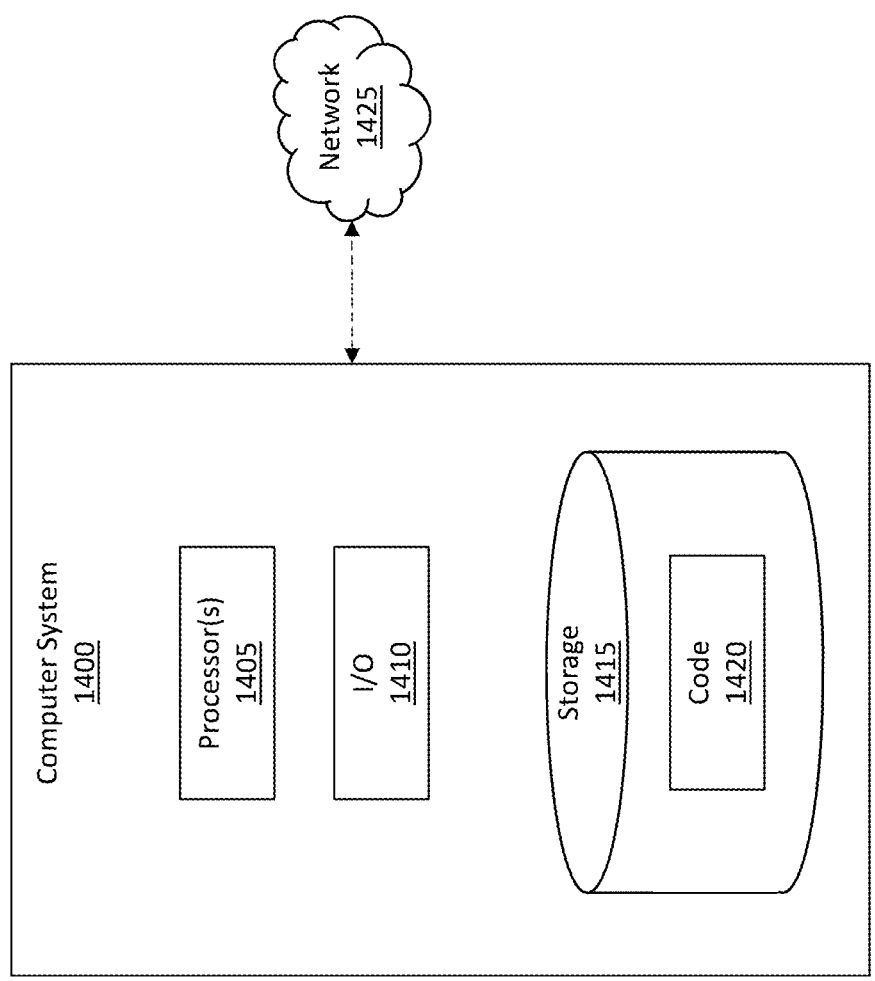
FIG. 14 illustrates an example computer system capable of implementing any of the disclosed operations for secure channel hopping over a TVWS spectrum.

Attention will now be directed to FIG. 14 which illustrates an example computer system 1400 that may include and/or be used to perform any of the operations described herein. Computer system 1400 may take various different forms. For example, computer system 1400 may be embodied as a tablet, a desktop, a laptop, a mobile device, a cloud device, a wearable device, or a standalone device. Computer system 1400 may also be a distributed system that includes one or more connected computing components/devices that are in communication with computer system 1400.

In its most basic configuration, computer system 1400 includes various different components. FIG. 14 shows that computer system 1400 includes one or more processor(s) 1405 (aka a "hardware processing unit"), input/output (I/O) 1410, and storage 1415.

Regarding the processor(s) 1405, it will be appreciated that the functionality described herein can be performed, at least in part, by one or more hardware logic components (e.g., the processor(s) 1405). That is, any of the disclosed method acts and operations may be performed by the processor(s) 1405. Illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

I/O 1410 includes any type of input or output device. Such devices include, but are not limited to, touch screens, displays, a mouse, a keyboard, HMD displays, and so forth. Any type of input or output device should be included among I/O 1410, without limitation.

In some embodiments, computer system 1400 includes a machine learning (ML) engine that is configured to perform any of the machine learning or dynamic/deep neural network (DNN) operations disclosed herein. The ML engine may be implemented as a specific processing unit (e.g., a dedicated processing unit as described earlier) configured to perform one or more specialized operations for the computer system 1400. As used herein, the terms "executable module," "executable component," "component," "module," or "engine" can refer to hardware processing units or to software objects, routines, or methods that may be executed on computer system 1400. The different components, modules, engines, and services described herein may be implemented as objects or processors that execute on computer system 1400 (e.g. as separate threads). The ML engine (or perhaps even just the processor(s) 1405) can be configured to perform any of the disclosed method acts or other functionalities.

Storage 1415 may be physical system memory, which may be volatile, non-volatile, or some combination of the two. The term "memory" may also be used herein to refer to non-volatile mass storage such as physical storage media. If computer system 1400 is distributed, the processing, memory, and/or storage capability may be distributed as well.

Storage 1415 is shown as including executable instructions (i.e. code 1420). The executable instructions (i.e. code 1420) represent instructions that are executable by the processor(s) 1405 of computer system 1400 to perform the disclosed operations, such as those described in the various methods. Storage 1415 can also include any type of data, including previously stored transmit power, transmission loss, data collected by sensors in communication with the client device, etc.

The disclosed embodiments may comprise or utilize a special-purpose or general-purpose computer including computer hardware, such as, for example, one or more processors (such as processor(s) 1405) and system memory (such as storage 1415), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1400 may also be connected (via a wired or wireless connection) to external sensors or devices via a network 1425. For example, computer system 1400 can communicate with any number devices or cloud services to obtain or process data. In some cases, network 1425 may itself be a cloud network. Furthermore, computer system 1400 may also be connected through one or more wired or wireless networks 1425 to remote/separate computer systems(s) that are configured to perform any of the processing described with regard to computer system 1400.

A "network," like network 1425, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1425. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

The computer system 1400 may also be configured to access a corpus of training data that is located externally to the computer system 1400. This corpus may be used to train, further train, tune, or refine the DNN of the computer system 1400.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing a secure channel hopping platform for transmitting or receiving messages over a television whitespace (TVWS) spectrum, said method being performed by a computer system and comprising:
    receiving a message from a client device, the message being received over a first channel in the TVWS spectrum and including a transmit power of the client device used to transmit the message;
    measuring a receiving power associated with receiving the message at the computer system;
    dynamically computing a transmission loss associated with the message by computing a difference between the transmit power and the receiving power, the transmission loss being selected to operate as a secret key for channel hopping;
    using the secret key to select a second channel in the TVWS spectrum;
    determining whether the second channel is free;
    in response to determining the second channel is free, causing the second channel to be selected as a new hopping channel;

in response to determining the second channel is not free:
    using a combination of the secret key and a new parameter to select a third channel in the TVWS spectrum;
    determining the third channel is free; and
    causing the third channel to be selected as the new hopping channel;
generating an acknowledgement (Ack) message that is structured to include channel hopping data, wherein:
    when the second channel is selected as the new hopping channel, (i) the channel hopping data is structured to include a transmit power of the computer system used to transmit the Ack message, or (ii) the channel hopping data is null; or
    when the third channel is selected as the new hopping channel, the channel hopping data includes at least the new parameter;
transmitting the Ack message to the client device; and
transitioning to the new hopping channel in preparation to receive a new message from the client device over the new hopping channel.

2. The method of claim 1, wherein the transmission loss is dynamically computed each time a new message is received from the client device.

3. The method of claim 1, wherein determining whether the second channel or the third channel is free is performed by measuring a noise interference of the second channel or the third channel.

4. The method of claim 1, wherein, when the third channel is selected as the new hopping channel, the channel hopping data includes only the new parameter.

5. The method of claim 1, wherein, when the third channel is selected as the new hopping channel, the channel hopping data includes a combination of the new parameter and the transmit power of the computer system used to transmit the Ack message.

6. The method of claim 1, wherein, when the second channel is selected as the new hopping channel, the channel hopping data is null such that the client device is triggered to look up a previously computed transmission loss.

7. The method of claim 1, wherein the new parameter is a randomly generated number.

8. The method of claim 1, wherein the message received from the client device is an encrypted message.

9. The method of claim 1, wherein using the combination of the secret key and the new parameter to select the third channel in the TVWS spectrum is performed using the following algorithm:

$$j=(k+l+i)\bmod N$$

where:
    j is a next channel code used to select a next hopping channel;
    k is the secret key;
    l is the new parameter;
    i is a previous channel code used to select the first channel; and
    N is a number indicating how many frequencies are available.

10. The method of claim 1, wherein using the secret key to select the second channel in the TVWS spectrum is performed using the following algorithm:

$$j=(k+i)\bmod N$$

where:
    j is a next channel code used to select a next hopping channel;
    k is the secret key;
    i is a previous channel code used to select the first channel; and
    N is a number indicating how many frequencies are available.

11. A computer system configured to provide a secure channel hopping platform for transmitting or receiving messages over a television whitespace (TVWS) spectrum, said computer system comprising:
one or more processors; and
one or more computer-readable hardware storage devices that store instructions that are executable by the one or more processors to cause the computer system to at least:
    receive a message from a client device, the message being received over a first channel in the TVWS spectrum and including a transmit power of the client device used to transmit the message;
    measure a receiving power associated with receiving the message at the computer system;
    dynamically compute a transmission loss associated with the message by computing a difference between the transmit power and the receiving power, the transmission loss being selected to operate as a secret key for channel hopping;
    use the secret key to select a second channel in the TVWS spectrum;
    determine whether the second channel is free;
    in response to determining the second channel is free, cause the second channel to be selected as a new hopping channel;
    in response to determining the second channel is not free:
        use a combination of the secret key and a new parameter to select a third channel in the TVWS spectrum;
        determine the third channel is free; and
        cause the third channel to be selected as the new hopping channel;
    generate an acknowledgement (Ack) message that is structured to include channel hopping data, wherein:
        when the second channel is selected as the new hopping channel, (i) the channel hopping data is structured to include a transmit power of the computer system used to transmit the Ack message, or (ii) the channel hopping data is null; or
        when the third channel is selected as the new hopping channel, the channel hopping data includes at least the new parameter;
    transmit the Ack message to the client device; and
    transition to the new hopping channel in preparation to receive a new message from the client device over the new hopping channel.

12. The computer system of claim 11, wherein the computer system and the client device are asymmetric devices such that the transmit power of the client device is different from the transmit power of the computer system.

13. The computer system of claim 11, wherein using the combination of the secret key and the new parameter to select the third channel in the TVWS spectrum is performed using the following algorithm:

$$j=(k+l+i)\bmod N$$

where:
    j is a next channel code used to select a next hopping channel;
    k is the secret key;

l is the new parameter;

i is a previous channel code used to select the first channel;

N is a number indicating how many frequencies are available; and wherein k and N are selected to be coprime.

14. The computer system of claim 11, wherein a distance between the computer system and the client device is greater than 0.5 miles.

15. The computer system of claim 11, wherein the second channel is not free as a result of a denial of service (DNS) attack occurring on the second channel.

16. The computer system of claim 11, wherein the computer system is connected to a gateway and to an Internet.

17. The computer system of claim 11, wherein the computer system includes multiple transmitters for simultaneously communicating with multiple client devices.

18. The computer system of claim 11, wherein the computer system is further configured to provide the following security capabilities relative to the client device: (i) hardware root of trust, (ii) device authentication and attestation, (iii) message authentication and encryption, (iv) real-time vulnerability analysis, and (v) over-the-air updates.

19. A method for providing a secure channel hopping platform for transmitting or receiving messages over a television whitespace (TVWS) spectrum, said method being performed by an Internet-of-Things (IoT) device and comprising:

transmitting a message to a TVWS base station, the message being transmitted over a first channel in the TVWS spectrum and including a transmit power of the IoT device used to transmit the message;

receiving an acknowledgement (Ack) message from the TVWS base station, the Ack message including channel hopping data usable by the IoT device to dynamically compute a new channel in the TVWS spectrum, the new channel being one that the IoT device is to subsequently hop to in order to transmit a new message to the TVWS base station, the channel hopping data comprising at least one of:

a null value; or a transmit power of the TVWS base station used to transmit the Ack message to the IoT device; or a new parameter;

using the channel hopping data to compute a secret key that is to be used to determine the new channel on which to transmit the new message to the TVWS base station;

transmitting a new message to the TVWS base station over the new channel.

20. The method of claim 19, wherein using the channel hopping data to compute the secret key is performed by:

when the channel hopping data comprises the null value, looking up a previously stored transmit power of the TVWS base station and computing the secret key by computing a first difference between the previously stored transmit power and a measured receiving power associated with the Ack message at the IoT device; or when the channel hopping data comprises the transmit power of the TVWS base station, computing the secret key by computing a second difference between the transmit power received in the channel hopping data and the measured receiving power associated with the Ack message at the IoT device; or when the channel hopping data comprises the new parameter, computing the secret key by computing a third difference between the previously stored transmit power and the measured receiving power associated with the Ack message at the IoT device plus a value included as the new parameter.

* * * * *